United States Patent [19]
Stitz et al.

[11] Patent Number: 5,971,107
[45] Date of Patent: Oct. 26, 1999

[54] SYSTEM FOR SUPPLYING LUBRICANT TO A PLURALITY OF BEARINGS

[75] Inventors: Albert Stitz, Kurten; Wolfgang Hahmann, Kempen; Franz Peter Salz, Remscheid, all of Germany

[73] Assignee: Barmag AG, Remscheid, Germany

[21] Appl. No.: 08/958,031

[22] Filed: Oct. 27, 1997

Related U.S. Application Data

[62] Division of application No. 08/325,298, Feb. 28, 1995, Pat. No. 5,711,615.

[30] Foreign Application Priority Data

| Mar. 18, 1993 | [DE] | Germany | 43 08 640 |
| Apr. 28, 1993 | [DE] | Germany | 43 13 869 |
| Nov. 24, 1993 | [DE] | Germany | 43 39 943 |
| Nov. 24, 1993 | [DE] | Germany | 43 39 942 |
| Nov. 24, 1993 | [DE] | Germany | 43 39 940 |
| Feb. 11, 1994 | [DE] | Germany | 44 04 301 |
| Mar. 8, 1994 | [DE] | Germany | 44 07 647 |

[51] Int. Cl.$^6$ .................................................. F16C 33/66
[52] U.S. Cl. ............................................. 184/7.4; 184/108
[58] Field of Search ........................... 384/475; 184/6.4, 184/7.4, 67, 75, 82, 108

[56] References Cited

U.S. PATENT DOCUMENTS

| 2,040,803 | 5/1936 | Buckwalter . | |
| 2,217,801 | 10/1940 | Katcher . | |
| 2,717,184 | 7/1955 | Amerman . | |
| 3,190,561 | 6/1965 | Fuller et al. . | |
| 3,837,430 | 9/1974 | Decker et al. | 184/1 E |
| 4,108,506 | 8/1978 | Osborn . | |
| 4,312,546 | 1/1982 | Bayer et al. . | |
| 4,527,661 | 7/1985 | Johnstone et al. . | |
| 4,784,578 | 11/1988 | Gruett . | |
| 4,784,584 | 11/1988 | Gruett . | |
| 4,955,953 | 9/1990 | Kayser . | |
| 5,060,761 | 10/1991 | Arndt et al. | 184/6.14 |
| 5,125,807 | 6/1992 | Kohler et al. . | |
| 5,192,139 | 3/1993 | Hiramoto et al. . | |
| 5,253,985 | 10/1993 | Ruetz | 417/407 |
| 5,285,871 | 2/1994 | Sievenpiper | 184/7.4 |
| 5,287,833 | 2/1994 | Yashiro | 123/196 |
| 5,381,874 | 1/1995 | Hadank et al. | 184/6.4 |
| 5,769,182 | 6/1998 | Parenteau | 184/6.4 |

FOREIGN PATENT DOCUMENTS

| 026 488 | 1/1984 | European Pat. Off. . |
| 0 374 958 | 6/1990 | European Pat. Off. . |
| 0 399 323 | 11/1990 | European Pat. Off. . |
| 0 458 499 | 11/1991 | European Pat. Off. . |
| 0 350 734 | 9/1992 | European Pat. Off. . |
| 1 346 823 | 11/1963 | France . |
| 1 474 780 | 2/1967 | France . |
| 1 502 171 | 10/1967 | France . |
| 1 301 956 | 8/1969 | Germany . |
| 195392 | 4/1924 | United Kingdom . |

OTHER PUBLICATIONS

Patent Abstracts of Japan, vol. 004, No. 090 (P–017), Jun. 27, 1980 & JP 55 052927 A (Mitsubishi Electric Corp), Apr. 17, 1980.

"Konstruktion von Spindel–Lager–Systemen für die Hochgeschwindigkeits–Materialbearbeitung" by Manfred Weck et al., Expert Verlag, Ehningen, Germany, 1990, pp. 80–81, 122–125, 170–173, 218–219.

*Primary Examiner*—Tamara L. Graysay
*Assistant Examiner*—David M. Fenstermacher
*Attorney, Agent, or Firm*—Alston & Bird LLP

[57] ABSTRACT

A lubrication system for supplying lubricant to a plurality of antifriction bearings, and which has a lubricant supply tank and a closed circuit lubricant supply line having two ends which communicate with the tank. A pump circulates the lubricant through the line, and a pressure regulating valve in the downstream end portion of the line maintains a desired pressure in the line. A plurality of tap lines lead from the closed circuit supply line to respective bearings via a metering or controllable valve.

19 Claims, 13 Drawing Sheets

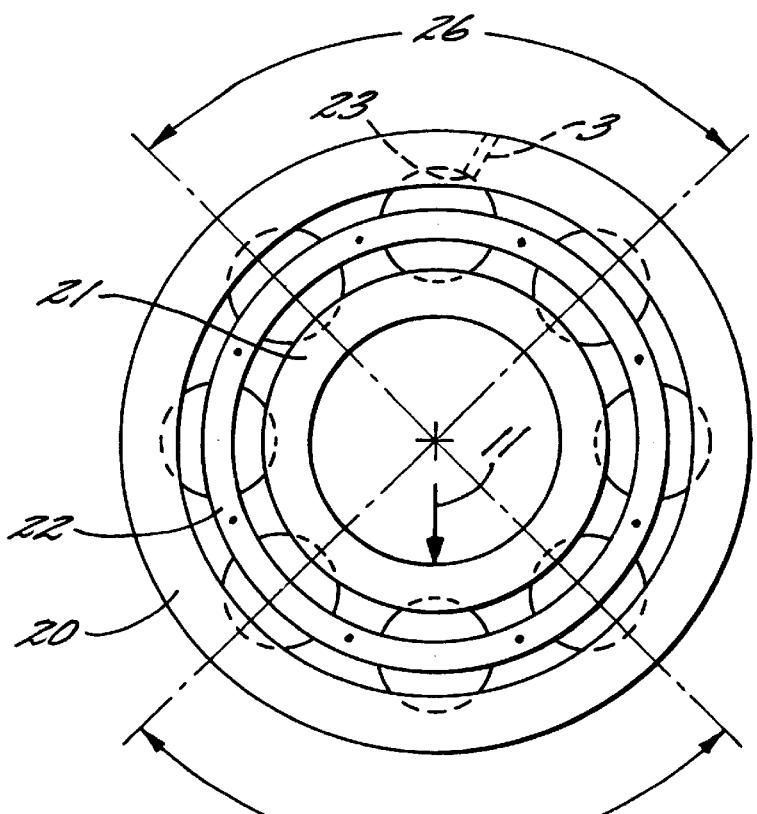
_fig. 2a._
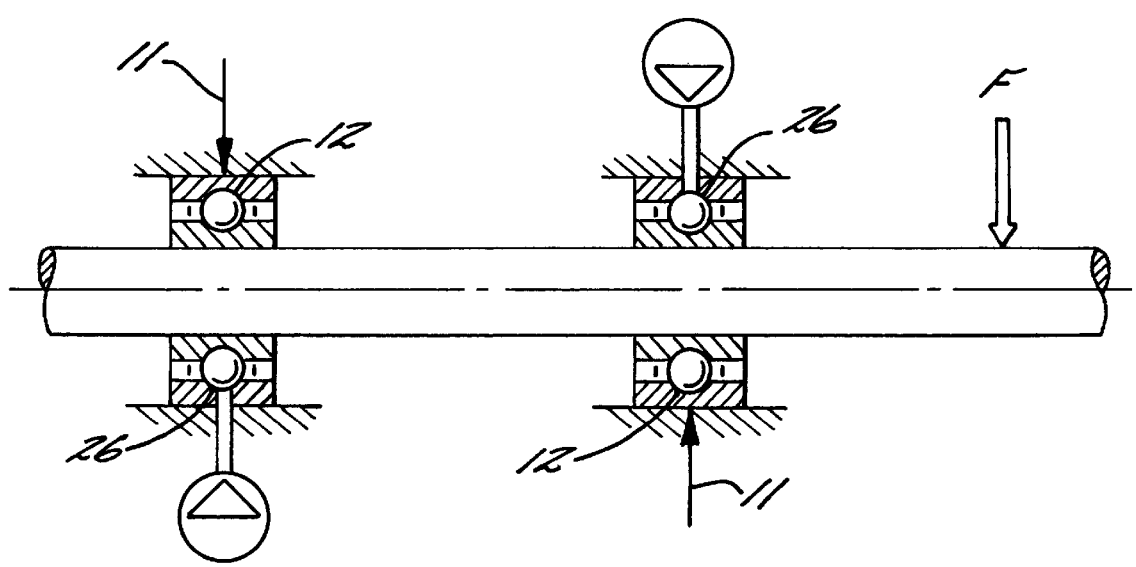
_fig. 2b._

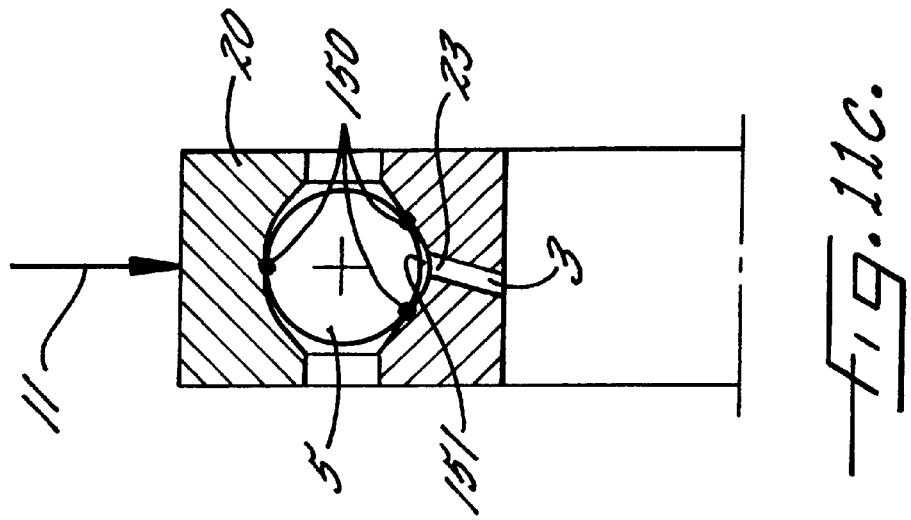
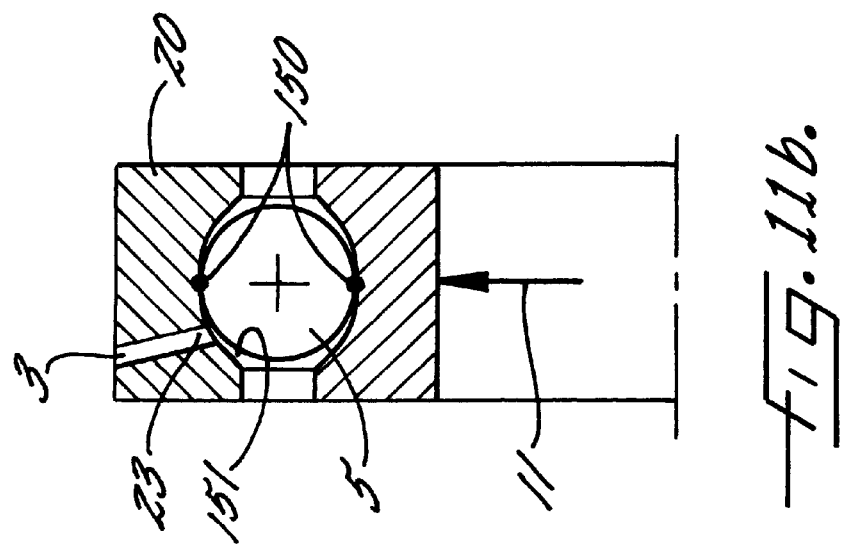
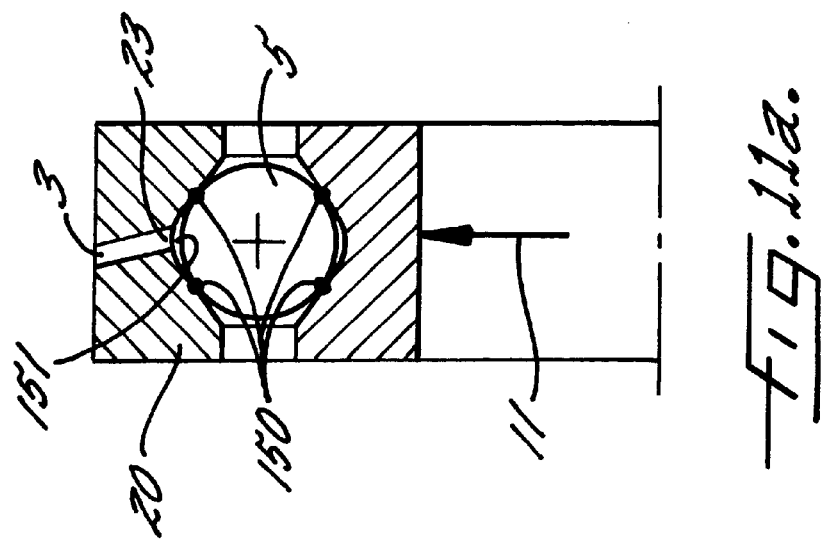

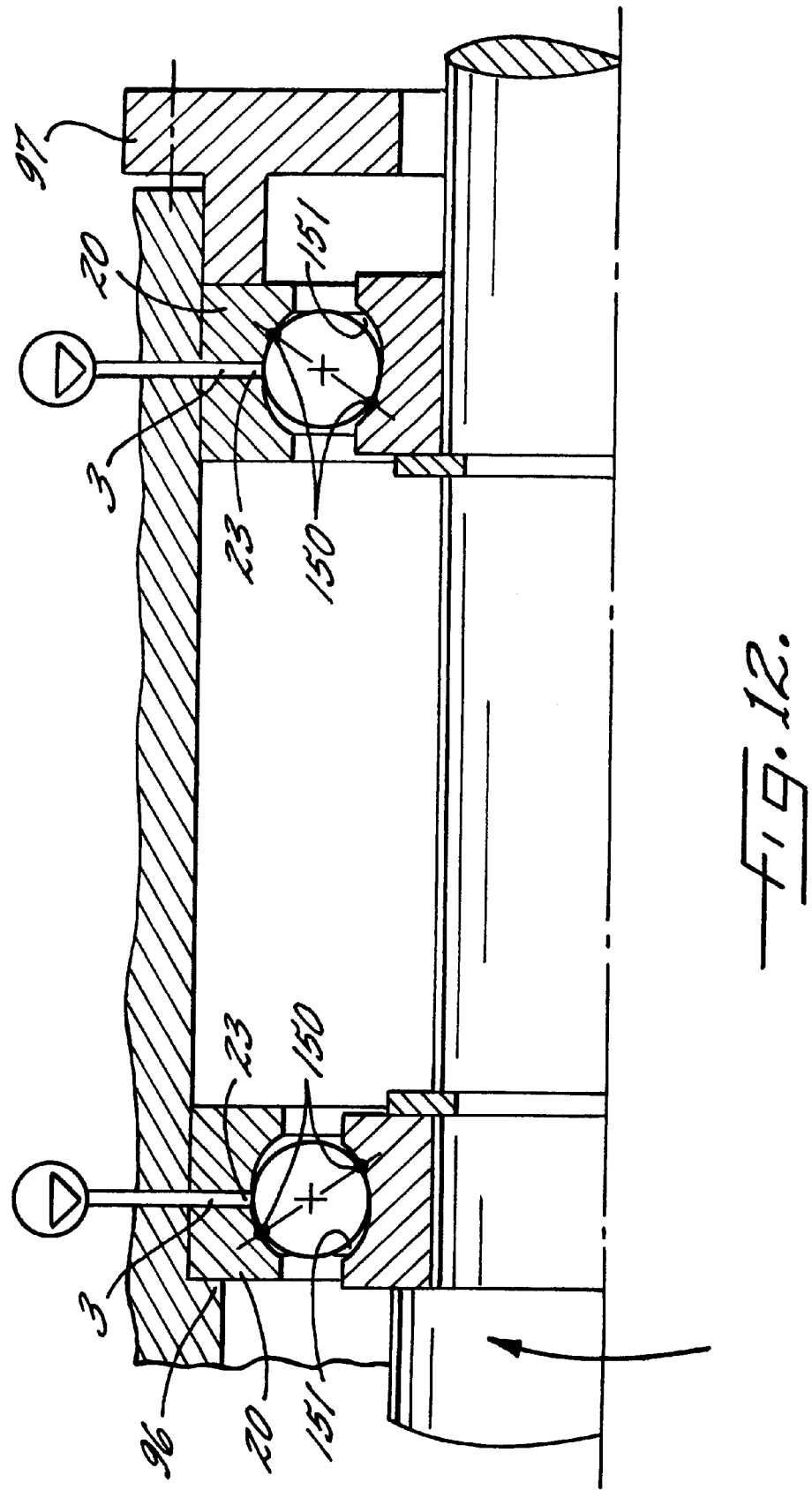

SYSTEM FOR SUPPLYING LUBRICANT TO A PLURALITY OF BEARINGS

This application is a divisional of application Ser. No. 08/325,298, filed Feb. 28, 1995 now U.S. Pat. No. 5,711,615.

BACKGROUND OF THE INVENTION

The present invention relates to antifriction bearings having a lubricant supply system wherein one of the bearing rings is provided with a lubricant supply duct. Antifriction bearings of this type are known from "Konstruktion von Spindel-Lager-Systemen für die Hochgeschwindigceits-Materialbearbeitung," Manfred Weck et al., expert Verlag, Ehningen.

In these antifriction bearings, a cleaning of the antifriction bearing by flushing occurs along with the lubricant supply. As a result, there is always more lubricant supplied into the antifriction bearing than needed. It is therefore necessary to remove and discharge the excessive lubricant. Also, additional work energy must be applied to compensate for "splash" work loss, and also an additional heating of the bearing occurs as a consequence of the splash work, as well as a wear of lubricant. EP 350 734 also discloses devices for supplying a lubricant to antifriction bearings. In these antifriction bearings, the lubricant is supplied through conduits, or nozzles, through which the lubricant mixed with an air current is blown into the bearing.

A disadvantage of this embodiment is that besides the supply of lubricant to the point of lubrication, the environment is contaminated by the lubricant. Moreover, this type of construction causes a relatively high lubricant consumption, since besides the lubricant required for the actual point of lubrication, it is also necessary to consider the loss of lubricant which is blown into the environment.

While the selection of a relatively highly viscous lubricant allows these losses to be relatively low, they cannot be entirely avoided. On the other hand, highly viscous lubricants for certain applications, interfere with the easy motion of a bearing, as is required in particular for godets for yarns, which rotate at a very high speed and substantially free of resistance. In particular in the case of godets, the contamination of the environment by oil mist is of relevant importance, since it is absolutely necessary to prevent the product from being soiled.

It is also known to provide such antifriction bearings with a permanent filling or lubrication, the bearing in this instance being hermetically sealed by means of washers arranged on both sides of the rolling element.

Prerequisite for such a permanent lubrication are correspondingly pasty, or highly viscous lubricants, so as to ensure a long-term sealing of the antifriction bearing. However, this in turn has the disadvantage that the viscosity of the lubricant is highly dependent on the temperature of is the bearing.

It is therefore the object of the present invention to further develop the supply of lubricant to antifriction bearings, so as to ensure with a low lubricant throughput an effective and substantially lossfree lubrication of the antifriction bearing.

SUMMARY OF THE INVENTION

This object is accomplished by the provision of an antifriction bearing which comprises inner and outer bearing rings, an inner race formed on the inner bearing ring and an outer race formed on the outer bearing ring, and a plurality of rolling elements confined between the races. Also, a duct is provided in one of the bearing rings and which is connected to a lubricant supply device, and the duct terminates at an outlet opening in the region of the race of the respective bearing ring.

Contrary to all previously known technologies, the configuration of the antifriction bearing in accordance with this invention, allows the antifriction bearing to operate with a minimally possible and yet optimal quantity of lubricant. The combination of these two influential parameters for the service life of an antifriction bearing still leads, despite smallest quantities of lubricant, to an extended service life, and this with the least burden to the environment.

The invention also has the advantage that the lubricant is supplied directly and exclusively into the region of the rolling elements. It is therefore necessary to adjust the quantity of lubricant supplied only to the immediate requirements of the antifriction bearing. The lubricant may be supplied intermittently in small measured quantities, since the total quantity of the lubricant supplied is fed and used exclusively in the region of the rolling elements.

Depending on the application, the lubricant may be supplied in a solid, pasty, or liquid form, i.e., in compact form without being mixed with air. The direct supply of the lubricant into the region of the rolling elements causes the lubricant to settle free of mist on the races is of the rolling elements, and so as to result in the buildup of a thin lubricant film between the rolling elements and their races.

Based on the small amount of lubricant required for such antifriction bearings, it is preferred to proceed from the fact that a single duct in one of the bearing rings will suffice to supply the lubricant in the required quantity. However, several ducts may be employed which are arranged, one following the other, in a single axial plane of the antifriction bearing or in the circumferential direction.

Since it is necessary that the metered quantities of lubricant be very small, especially when supplied to small antifriction bearings of fast rotating godet on textile machines, the diameter of the duct can be very small, i.e. it may be in the millimeter range or less (for example, 0.5 mm).

Depending on the particular installation, the duct may be arranged either in the inner ring or outer ring of the bearing. In addition, the inner ring or outer ring of the bearing may be formed by a machine element.

It is preferred that the duct be located in the stationary bearing ring, since this has the advantage of a simple connection to a lubricant supply line.

To optimize the lubrication effect, one should consider the centrifugal force which is effective on the lubricant. Consequently, the lubricant may need to be supplied to the inner ring.

It is often possible however to provide the duct in the rotating bearing ring. In this instance, it would be necessary to connect the lubricant supply line to the duct, via a meshing channel or a rotating fluid coupling.

With its characteristic features, the invention snakes it possible to supply the lubricant to the race of the rolling elements along a shortest possible path. Thus, these features can result in a direct supply of lubricant to locations where the lubricant is needed.

It is also preferred that the lubricant duct be located in a zone of the bearing surface which carries a reduced load, and be structured such that it terminates in a peripheral zone of reduced surface pressure. In each instance, the rolling elements are prevented from falling into the duct, so that a smooth run can be realized. Consequently, the smooth run is likewise not disturbed by the duct. Thus, periodically occurring vibrations in the bearing are avoided, so as to permit the rolling elements to move in their races substantially evenly and free of vibrations, and to further prevent a damage to the surfaces of the rolling elements and their races by periodically occurring vibrations of the bearing.

Likewise, it is avoided that in the course of time the antifriction bearings close the duct by their rolling motion.

A zone of a reduced load on the bearing may be created in an antifriction bearing by a special structuring of the race of the rolling elements. In this instance, the race of the rolling elements is designed such that the rolling element is supported primarily in two annular, spaced-apart regions. Located between these regions of support is an annular zone with a lesser pressure per unit area, in which the duct or ducts can be arranged. Regardless of the type of construction, however, a zone of reduced load develops in each antifriction bearing on the side facing away from the transverse force of the bearing. The transverse force operative on an antifriction bearing is the external force directed transversely to the shaft axis, which keeps the shaft in balance together with the external load as well as the other transverse forces of the bearing. External loads and transverse forces of the bearing which occur on a shaft, lie more or less in an axial plane. Also located in this axial plane is the duct, namely, on the side facing away from the transverse force of the bearing.

In one embodiment, the duct is supplied with lubricant from the outside, via a groove which communicates with the duct and extends in the same normal plane. In this embodiment, the angular position of the corresponding bearing ring, when installed, is of no significance, since the lubricant groove is constructed as an annular groove, which extends at least over a partial circumference of the bearing seat, and is therefore connected with the lubricant supply line in all angular positions when installed.

In particular for high pressures of the lubricant, it may be appropriate to provide annular seals on both sides of the lubricant groove, so as to permit the formation of an impermeable annular space in the region of the lubricant groove, which is opened only for supplying the lubricant into the antifriction bearing through the duct.

The annular seals may be arranged in annular ring grooves formed either in the bearing ring or in the housing, or in the bearing seat on the shaft side for the bearing ring, or even in a combination of these two possibilities.

The duct is preferably connected to the pressure side of a lubricant pump, which serves to supply the lubricant under a predetermined accurate pressure. In this manner, when viewed over a period of time, an always uniform quantity of lubricant is supplied.

It is likewise possible to realize this advantage by connecting the duct with a lubricant reservoir which is maintained under pressure. In this instance, it will suffice, because of the low consumption of lubricant, to load the pressure reservoir only from time to time, for example by biasing a compression spring, which is operative on a piston that forces the lubricant out. In the meantime, i.e., while the pressure in the reservoir is slowly released, a pressure drop is accepted. The pressure reservoir thus need not be operated in a predetermined pressure range, and it need not be constantly adjusted to a single pressure value.

The following developments are especially advantageous for supplying several points of lubrication as they exist on multiposition textile machines.

Since antifriction bearings of the present invention permit an operation with a minimal, but still optimal quantity of lubricant, it is desirable that the lubricant be supplied from a source of lubricant under pressure via a metering device. Metering devices of a variety of types may be utilized, and they may include, for example, volumetric metering devices. When using the latter, a predetermined, small volume quantity is first collected and then displaced. The displacement in this instance occurs in time intervals, i.e., at a frequency which determines the metered quantity. The volume which is displaced each time, remains constant. However, the metering device may also be of flow-limiting type, such as, for example, magnetic valves which are opened and closed at predetermined time intervals and for a predetermined period of time. In this instance, the metered quantity is determined on the one hand by the opening times, and on the other hand by the throttle cross sections of the valve.

The invention is based on a very low consumption of the lubricant. This allows an unnecessary filling of the antifriction bearing to be avoided, which is not needed for the lubrication. At the same time, this avoids losses by splashing, i.e., an energy consumption which results from the friction of fluid, and causes likewise high bearing temperatures especially at high rotational speeds. Due to the low lubricant consumption, it is possible to arrange sealing disks at both sides of the races for the rolling elements.

Since the invention proceeds basically from a very low consumption of lubricant, sealing disks arranged on both sides of the rolling element races may bring advantages. These characteristics allow to prevent in particular an uncontrolled evaporation of the lubricant, for example, caused by a high bearing temperature. To a certain extent the sealing disks may be slightly permeable, so as to prevent an excessive filling of the bearing on the one hand, and to realize a dustproof sealing on the other hand.

However, an excessive filling of the antifriction bearing should be avoided in any event, so as to prevent additional losses by splashing, in particular at high rotational speeds, and the attendant high bearing temperatures.

The antifriction bearing of the present invention is particularly suitable for supporting rotable godets on a textile machine, which comprises a plurality of processing stations, since it is now possible to use fast rotating antifriction bearings with a long service life, while preventing environmental contamination, in particular, the soiling of the product by oil.

As a result, special importance is attached to the method aspects of the present invention and wherein the amount of the lubricant intermittently supplied to the antifriction bearing is determined in a control unit, in which a basic adjustment established by predetermined operating parameters is modified as a function of operating data or data of conditions which are continuously acquired on the bearing.

While in principle such a method is known from the aforesaid EP 350 734, this method operates, however, with high losses. Although the lubricant is supplied in a very accurately metered quantity to a transporting air current and supplied into the antifriction bearing, a portion of the very accurately metered lubricant is again flushed out by the air current. It is therefore necessary to supply a higher metered quantity of lubricant than is needed.

Only as a result of combining the measurement of parameters and the supply of lubricant directly into the region of the rolling element race can a consistency be expected to exist between the metered quantity of lubricant and the bearing-specific requirements for lubricant.

Therefore, this combination is especially suitable for use in the construction of textile machinery, for example, for supporting godets, where it is absolutely necessary to avoid a contamination by oil mist.

In accordance with the preferred embodiment of the invention, the lubricant is delivered to the individual antifriction bearings under increased pressure, and supplied there in a metered quantity in highly compact (fluid or pasty) form and free of mist. This offers the possibility of a progressive lengthening of maintenance intervals of such a multiposition textile machine. In this instance, it should be noted that such a textile machine comprises a plurality of bearing points, each of which is subjected to a certain wear.

The rotatably supported machine elements, such as, for example, godets, winding heads, are arranged along the direction of advance of a yarn, and they are contacted by the yarn until its takeup on a package. As a result, there exists the problem of having to shut down the entire machine, at least one processing station, when one of the antifriction bearings is defective.

Thus, in each instance, the minimal service life of the bearing determines the length of an operating phase, during which the textile machine operates continuously. Since upon the failure of one of the antifriction bearings all antifriction bearings are replaced for safety reasons, it is of great interest to extend the service life of the bearings, even under the difficult operating conditions in the case of textile machines.

Since this invention allows uniform and optimal operating conditions to be provided for all antifriction bearings, it becomes possible to increase the service life of the bearings at least substantially irrespective is of the bearing load.

This is accomplished in that, despite of the plurality of bearing positions, an individual adjustment of the lubricant supply to the actual lubricant requirement is realized for each antifriction bearing.

In other words, a constant correction of a basic adjustment occurs for each individual bearing. The basic adjustment is predetermined at the manufacturer's end. It results from empirical values and is corrected by the data of conditions of the individual bearing points. Among them are in particular the temperature. The data of conditions are input, for example, in a control unit and compared with the data of the basic adjustment stored therein. The basic adjustment should correspond to optimal operating conditions, so that the comparison of the data of conditions with the basic adjustment allows to realize a practically ideal supply of lubricant within the range of the optimal quantity of lubricant of each individual bearing.

Thus prerequisite for establishing the individual quantities of lubricant are the data of conditions which are individually obtained at each bearing location. To this end, it is possible to generate, for example, actual value signals from the bearing temperature, which are input in a control unit. It is further possible to generate actual value signals from the shaft speeds occurring on each bearing, which are input likewise into the central control unit. Calculated from the input actual value signals is in each instance the optimal lubricant requirement, which is to be supplied to each individual bearing.

For purposes of monitoring larger bearings, it is possible to provide in advantageous manner two or more temperature measuring points distributed over the circumference of the respective bearing, and to transmit to the central control unit the mean values which are determined from the measured values.

It is possible, though, to obtain certain operating parameters for controlling the metering of the lubricant by determining performance graphs. However, such performance graphs can always apply to only one installed situation, since it is necessary to individually ascertain all parameters, such as rotational speed, heating temperature, bearing arrangement, etc., individually, and to functionally correlate them with the metered quantity of lubricant.

In particular, in the case of textile machines, it has shown that the temperature has a plurality of influential factors.

These influential factors do not directly and necessarily relate to the influential factors, which generate the bearing temperature by friction. In textile machines, the bearing temperature is falsified, for example, not only by the operating conditions of the machine elements (godet), but also by the length of operation and the state of wear of the bearing.

It has been recognized that heated godets, which rotate slowly, have a higher bearing temperature than fast rotating godets. From this, it is obvious that the control/regulation of the metering of lubricant cannot proceed reliably by only measuring the bearing temperature.

It is also necessary to take into account that the relationship between bearing temperature and lubrication changes. This applies in particular for the reason that wear has a separate influence on the bearing temperature.

This gives rise to the further problem of finding an operating parameter, which permits a lubrication of the bearing that is clearly adapted to the need for lubricant. The term operating parameter or parameter of state is understood to be physical values which permit to describe the actual state of the bearing.

In one embodiment of the invention, the conditions which are monitored on the antifriction bearing for determining the metered quantity of the lubricant, include the vibration of the bearing, which is totally independent of the bearing temperature. The determinant "bearing vibration" is conceived to be an operating parameter or parameter of conditions, which is no doubt indicative of the lubricating conditions in the antifriction bearing. Thus, an actual state of the bearing is determined which is temperature-independent.

An advantage may be seen in that, while preventing assembly-specific performance graphs for the progression of the bearing temperature, easily determinable operating parameters are available for controlling the supply of lubricant in metered quantities.

A further advantage consists in that the condition of vibration is clearly indicative of the lubricant of the bearing, and therefore determines also the additional need as a result of wear. It is observed, for example, in a new bearing that a certain condition of lubrication causes vibrations to a certain degree.

What results is a useful evaluation, in particular it is possible to evaluate the amplitude. Accordingly, for example, amplitude peaks are ascertained, in that, for example, an upper limit is established for the amplitude, and that one determines the exceeding of the upper limit, the duration of the exceeding, the number of bearing vibrations, during which the limit value is exceeded, or the repetitiveness of exceeding the limit values.

It shows, however, that the lubricant requirements and the wear of the bearing can be determined synchronously, in particular in that certain frequency ranges of the vibrations are determined, for example by the Fourier analysis, and that their occurrence or the frequency of their occurrence are ascertained. A particularly indicative frequency range lies between 200 kHz and 500 kHz. Likewise, this embodiment of the invention allows to measure a certain vibrational behavior for each antifriction bearing.

To determine the vibrational behavior, a vibration sensor is installed is in the stationary portion of the antifriction bearing, the lubrication of which is to be metered. Bearing vibrations or oscillations occurring there are picked up continuously or at certain time intervals. Depending on the bearing load, rotational speed, and condition of the bearing, time intervals of hours are permissible. The occurring vibrations are then analyzed. A simple method of analyzing consists in that certain tolerance limits are predetermined, that it is then determined whether the vibration amplitudes leave the tolerance range. In this case, a tolerance band is established, within which the bearing vibrations are allowed. When the vibration amplitudes leave the tolerance band, as is the case shortly before a dry operation sets in, it will be necessary to relubricate. To make sure that the amplitude of the bearing vibration and the exceeding of the predetermined tolerance limits are an adequately accurate indicator of the individual lubricant need and/or the wear, it may be recommendable to ascertain beforehand by test the life cycle of a bearing test in its respective range of application.

A reliable indication can be obtained from the amplitude analysis, when the latter is applied to vibrations of a certain frequency range.

The vibrations occurring in the bearing range of an antifriction bearing represent a superimposition of vibrations of different frequency ranges. A plurality of these frequency ranges is not indicative of the state of lubrication and/or the wear. For example, it has shown that, with respect to these criteria, vibrations in the frequency ranging from 200 kHz to 500 kHz are typical. For this reason, is its suggested that all vibrations outside of this frequency range, which is known to be indicative, are preferably filtered out. The amplitude analysis is then performed only with the vibrations of the critical frequency range, i.e., for example between 200 kHz and 500 kHz. While it cannot be precluded that also in the amplitude analysis, which relates only to a certain frequency range of the vibrations, an amplitude peak, which leads to exceeding the intended frequency range, is based on a superimposition of also such vibration frequencies, which are not indicative of the state of lubrication and wear, this method offers however already an adequately accurate possibility of adapting very accurately the quantity of lubricant to the actual requirements of lubricant.

Moreover, it has also shown that it is possible to make the lubricant supply more accurate. To this end, the determined vibrations are analyzed (Fourier analysis). It has shown indeed that vibrations of certain frequency ranges will not occur in satisfactorily lubricated bearings, it being presumed that satisfactorily lubricated bearings do not exhibit any noticeable wear. In any event, the amplitude height of the vibrations of this frequency range does not exceed a predetermined measure. Upon occurrence of these vibrations, a metered, very small quantity of lubricant will be supplied to the antifriction bearing. The monitoring of the bearing vibration has shown that as a result thereof the vibrations of this frequency range will again disappear. Should now, due to wear, the time intervals decrease between two successive states of vibration (amplitude peaks, frequency ranges), it will be possible to draw therefrom a conclusion to the extent of wear. On the other hand, it is possible to predict that wear will lessen, when a characteristic state of vibration recurs within a determined metering interval. In this event, it will be necessary to accordingly reduce the metering interval. Consequently, one can expect that the respective length of the metering intervals allows to conclude the actual wear, so that it becomes possible to reliably predict the maintenance intervals of such a machine.

As a result it becomes possible not only to adapt the bearing lubrication very sensitively to the wear, but to make nonetheless also reliable statements as to the state of wear. Thus, for the first time, a metering of the lubricant occurs, which is dependent on both the lubricant requirements and the wear.

Operating parameters to consider include in particular bearing vibrations of selected frequency ranges and/or bearing vibrations having a selected amplitude height, it being possible to measure the time intervals between at least two successive, characteristic bearing vibrations or amplitudes. This allows to then determine the metering interval. A further improvement may be realized as follows: from the length of the metering interval, one may determine a so-called shortened metering interval, the length of which is somewhat shorter than the time interval measured between the successive occurrence of a characteristic vibrational behavior. This allows to avoid that a lubricant deficiency occurs at all.

The essential aspect of this further development of the invention is therefore based on the combination of the occurrence of a characteristic vibrational behavior in the antifriction bearing due to dry operation and the inclusion of the thus obtained time intervals into a control circuit for a regulated/controlled subsequent metering of lubricant.

Since, in principle, a subsequent metering can proceed very rapidly, and since on can basically presume a very fast distribution of the metered lubricant into the race of the rolling elements, the time intervals of the subsequent metering of lubricant may correspond essentially to the time intervals, at which the characteristic vibrational behavior after a preceding metered supply of lubricant is again detected.

A fact to refer to is that this method is considered not only for the antifriction bearings of the structure described herein, but also wherever a controlled supply of lubricant occurs to an antifriction bearing, in that the lubricant is supplied in a metered quantity as a function of the progression of a predetermined operating parameter. To this end, the vibrations generated by the antifriction bearing are gathered, and the operating parameter is determined from a vibrational behavior which is characteristic of a lubricant deficiency.

Thus it is possible, for example, to meter the supply of lubricant by the transport of the lubricant in the form of an oil mist, as is disclosed, for example in EP 350 734, as well as in EP 26 488.

Preferred is to supply the lubricant to the individual bearings in gaseous or liquid form as lubricating oil and under an increased pressure. To this end, suitable bores, if necessary also several bores for each bearing, are provided preferably in locations of the bearing carrying the least load. It is useful to provide in the outside of the bearing rings, or better however in the housing bores accommodating the outer rings of the bearing, annular channels connecting to the lubrication oil supply, through which the lubrication oil enters into the bearings.

The measuring and delivery (metering) of the lubricating oil destined for the individual bearing can occur in different ways. Thus, each bearing may be associated with its own pump, for example, a segment of a multiple pump (the segments of which, however, need to be individually controllable with respect to the quantities to be delivered). Displacement pumps have shown to be especially suited. However, the lubricating oil may also be supplied locally by a valve, in particular controlled by a magnetic valve, from a pressure oil tank, which is refilled by a pump from time to time.

In particular in these instances, it is possible to control the amount of lubricating oil respectively supplied to a bearing, while maintaining regular time intervals between the opening signals, by changing the respective pulse duration, or while maintaining the same pulse duration, by varying the time intervals between opening signals, which are adapted to the momentarily required amount of lubricating oil.

In accordance with the invention, extremely small quantities of lubricant are required. Therefore, the problem of aging lubricant, sedimentation, resinification, or saponification may arise both in the instance of a controlled lubricant supply to the antifriction bearing, and in the instance of an uncontrolled lubricant supply (for example, the supply of lubricant in a fixedly predetermined timing cycle).

The above problems may be alleviated by the provision of a closed circuit supply line for the lubricant, which is connected with a lubricant pump having a tank, and with a pressure increasing device, such as a non-return valve, for increasing the pressure of the tank. Also, between the pump and the non-return valve are tap lines and a metering device associated with each bearing.

This further development of the invention brings the advantage that the closed-circuit supply system represents a constantly flushed main line, in which the lubricant is kept hermetically sealed against air, thereby preventing an artificial aging of the lubricant.

On the other hand, a certain quantity of lubricant is always in circulation. The constant circulation of the lubricant in the closed-circuit supply system, allows to accomplish an approximately continuous, automatic evacuation of air, and yet to supply to each antifriction bearing always a very accurately metered, smallest amount of lubricant.

A throttle may be positioned in the closed circuit supply line upstream of the non-return valve. The combination of a throttle with a subsequent non-return valve, which opens toward the tank against a spring, ensures that despite the constant flushing of the main line an adequate pressure is always present for supplying a plurality of antifriction bearings with their associated metering pumps or metering valves, as will be described in greater detail with reference to the circuit diagram.

If, in the place of the subsequent non-return valve, a time-controlled stop valve is used as a device for increasing pressure, it will be possible to realize a flushing of the closed-circuit supply system independent of its length and diameter, throttle dimensions, and temperature.

The closed circuit supply line may be connected with a pressure reservoir, which is located in the forward flow portion of the supply line. This construction takes account of the fact that the lubricant is an incompressible medium, so that at a corresponding frequency of removal, the stored pressure also decreases relatively fast. If the closed-circuit supply system is provided with an additional pressure reservoir, the pressure in the closed-circuit supply will be made uniform. Pressure pulsations are unable to develop by either by feeding the oil by means of the pump, or removing the oil by means of the metering device. Furthermore, it is possible to supply the lubricant from time to time by means of a pressure pump, and to keep the pressure in this manner within a predetermined range during the lubricant removal cycles. To this end, it is necessary that the pressure reservoir keep the oil under pressure. To do so, an oil reservoir may be used, the tank capacity of which is biased by a spring-loaded or compressed-gas loaded piston. Likewise, it is possible to subject the oil in the tank directly to the load by a compressed gas.

An important characteristic is that the pressure reservoir should be located in the forward flow portion of the closed-circuit supply system. This allows to realize a forced flushing in the direction toward the other end of the closed-circuit supply system, and to compensate in a simple manner for the pressure losses within the closed-circuit system.

The metering device may be a metering pump, such as a piston pump. This construction offers the advantage of an accurate measuring of each metered amount of lubricant. In particular, a piston-operated metering pump in accordance with the invention delivers a fixedly predetermined volume of discharge. In this instance, it is only necessary to adjust the startup frequency of the metering pump to the case of application or to control same as a function of the bearing condition.

In another embodiment, the metering device may be a valve, such as a magnetic valve. This has the advantage that keeping the valve periodically open allows to occasionally flush the line between the valve and antifriction bearing.

The tap lines preferably extend from the closed circuit line with a downgrade toward the metering device. This provides a favorable effect on the automatic bleeding of the tap line, since air not dissolved in the lubricant will always attempt to remain in the closed-circuit supply system, whence is continuously discharged. This method, when viewed in the course of time, has a favorable effect on a uniform supply of lubricant to the antifriction bearing. This advantage is realized by downwardly inclined tap lines, in which any possibly present air always rises upward as a result of buoyancy, so as to be entrained in the closed-circuit supply system by the flushing operation.

The pressure in the closed circuit supply line is preferably maintained between an upper limit valve and a lower limit valve, and the closing pressure of the non-return valve is between the upper and lower values. This feature may be used in particular for a fully automatic pressure control, once the upper limit value as well as the closing pressure of the subsequent non-return valve are determined.

This allows to influence in addition the respective flushing time by adjusting the closing pressure of the non-return valve. If the closing pressure is near the upper limit value, the flushing time will be shorter than when the closing pressure is closer to the lower limit value.

This offers the advantage of an additional operational reliability which is enabled alone by controlling the pressure.

In this connection, an additional advantage is achieved by having the inlet pressure of the metering device picked up by a pressure monitor, and such that when the inlet pressure falls below a lower limit valve, a disconnecting signal is emitted to shut down the associated bearing. By is this arrangement, an operational reliability of the antifriction bearing may be ensured, even when no lubricant is supplied. In this instance, the time delay is measured by the time which will lapse until the lubricant is used up in the antifriction bearing.

Advantageously, the lubricant is metered by hydraulic devices as further described below. However, it should be expressly stated that these measures are useful both in antifriction bearings without controlled metering of the lubricant and in antifriction bearings with a controlled metering of the lubricant.

Moreover these measures should expressly be viewed both in combination with a closed-circuit supply system as described herein, and also separately therefrom.

Hydraulic devices for metering lubricating oils in antifriction bearings are known, though, from U.S. Pat. Nos.

4,784,578 and 4,784,584. They disclose devices operated by a separate pump, in which a piston is actuated under the pressure of the lubricating oil delivered by the pump, and which pumps out the amount of lubricating oil being in the cylinder. These devices are structured in a complicated manner. In particular, they are provided with an inlet valve, which allows and effects a filling of the cylinder as a function of the piston stroke. The filling is thereby subjected to inertia, i.e., it is dependent on the movement of the inlet valve and the flow of the fluid. Consequently, the piston can be moved only so fast that adequate time is left for the fluid to follow.

When using such pumps in the field of a metered lubrication of antifriction bearings, it is necessary to ensure a complete filling of the cylinder at a very fast piston movement. This requirement can be realized with a pump which comprises a cylinder, a pump piston arranged in a guideway coaxial with the cylinder and adapted for movement in the cylinder by a power drive, an inlet valve connected to a fluid supply, and an outlet valve. Also, an inlet chamber communicates with the cylinder and the guideway, and the inlet valve is formed by the boundary edge of the cylinder toward the inlet chamber, and the pump piston includes an end surface which is adapted to move between a position in front of the boundary edge and an immersed position in the cylinder.

The above solution is based on the fact that the inlet valve is formed by the piston itself and by the boundary edge between the cylinder and the inlet chamber. However, it is situated at an unusual location, namely, the inlet opening is released practically only when the piston has finished its intake motion. During this intake motion, the piston has produced in the cylinder a vacuum, into which the amount of lubricant to be metered flows in very swiftly, as soon as the piston moves with its front surface out of the emptied cylinder and into the inlet chamber.

In the further development of the invention the lubricant in the supply line is put under increased pressure and retained by a controllable valve, which has an outlet end in the lubricant supply line. The lubricant is thus stored under a pressure, which is above the atmospheric pressure. This allow to accomplish that the lubricant can be supplied in accurately metered quantities to the antifriction bearing at accurately scheduled times and during accurately predetermined periods of time. An essential difference from the metering pump lies in the variable volume of lubricant per metering, since the opening time of the valve determines the supplied volume of lubricant. As a function of the respective viscosity, it is possible to realize the required pressure level in a very simple manner, also from the viewpoint of reliability. Thus, low-viscosity lubricants will require likewise a low pressure level, so as to enable a metered supply of lubricant in the meaning of this invention.

However, it should be expressly stated that also very highly viscous lubricants can be used. In this instance, it would be necessary to raise the pressure to an accordingly high level, so as to be able to supply to the antifriction bearing the required amount of lubricant during a short opening time of the valve.

A further advantage lies in the metering device which is technically very simple to realize, and needs to have only an externally controllable valve.

A still further advantage which results from the invention, lies in that the outflowing lubricant bears little on the environment, since the invention, on principle, is based on very short opening times of the controllable valve. Thus, lubricant is supplied only in metered quantity, which is needed by the antifriction bearing. This fact is based on the recognition that the need of lubricant required by an antifriction bearing should be only small.

A certain throughput of lubricant through the antifriction bearing, however, has positive effects with respect to wear, since abrasive particles are carried away from the contact zones between rolling elements and their races by the lubricant, as it is throughput in the course of time.

The controllable valve in the lubricant supply line may be an electrically controllable magnetic valve, which offers the advantage that the valve can be activated rapidly both in direction of opening and in direction of closing, thereby making it possible to exactly maintain the accuracy of the quantity of lubricant supplied in each instance also over a plurality of lubrication intervals.

The control of the quantity of lubricant supplied to each bearing may occur via a sequence of tripping signals of a predetermined duration and controlled frequency. It may also occur via a sequence of predetermined frequency and controlled duration. Each such control method offers the possibility of guaranteeing with one and the same control system the supply of lubricant for different antifriction bearings, installed situations, rotational speeds and loads of the antifriction bearing, and abrasive wear, just to mention a few influential variables.

As a result, it is also possible to realize a modular structure of the control system, which covers certain ranges of diverse requirements, while simplifying stockkeeping.

The lubricant supply line may be designed as a pressure reservoir, which is preferably closed toward the inlet side by a non-return valve. This offers the advantage that the lubricant supply lines, which are anyhow present, are capable of assuming the additional function of a pressure reservoir. It has been recognized by the invention that the lubricant supply lines make available a certain volume, which allows to easily store the lubricant, and this under an increased pressure. This type of construction offers itself in particular for the retrofitting of existing antifriction bearings with an external supply of lubricant, since no further structural elements will be needed, except a controllable valve and, if need be, a non-return valve on the inlet side, as well as a device for increasing the pressure.

For certain applications, it is desirable that the lubricant be supplied from a pressure reservoir which is biased by a pressure medium, such as gas. This applies, for example, when the existing volume of the lubricant supply line appears to be too small, so as to realize a reliable lubrication of the antifriction bearing, when no lubricant is replenished.

In this event, the pressure reservoir serves, on the one hand, to store the excessive amount of lubricant, which cannot be accommodated in the lubricant supply line. On the other hand, it is possible to make available in the pressure reservoir a space which is occupied by the pressure medium. The thus occupied volume of the pressure reservoir will continue to be available for the pressure medium, even when the device for increasing the pressure fails to function. This circumstance results in the advantage that such failures can be temporarily buffered.

It has been recognized that in most applications, there is no need is to exactly maintain the lubricant pressure. As a consequence, this allows a pressure control to be utilized which is adapted to requirements.

In so doing, it is possible to determine the upper or lower limit value directly by a pressure measuring device. However, it is also conceivable, provided the need for lubricant is recognized, to realize the control by a simple timing operation.

BRIEF DESCRIPTION OF THE DRAWINGS

In the following description, the invention is described in more detail with reference to the drawings, in which:

FIG. 2a is an axial front view of the bearing shown in FIG. 1 and FIG. 2b is a side view of a pair of the bearings mounted on a common shaft;

FIGS. 11a, 11b, and 11c illustrate the invention in the three antifriction bearings with a no load zone in the race despite a transverse force; and FIG. 12 illustrates the invention with an axially biased shaft bearing support.

DETAILED DESCRIPTION OF THE PREFERRED EMBODIMENTS

Unless specified otherwise, the following description will apply always to all Figures.

Figure 1:
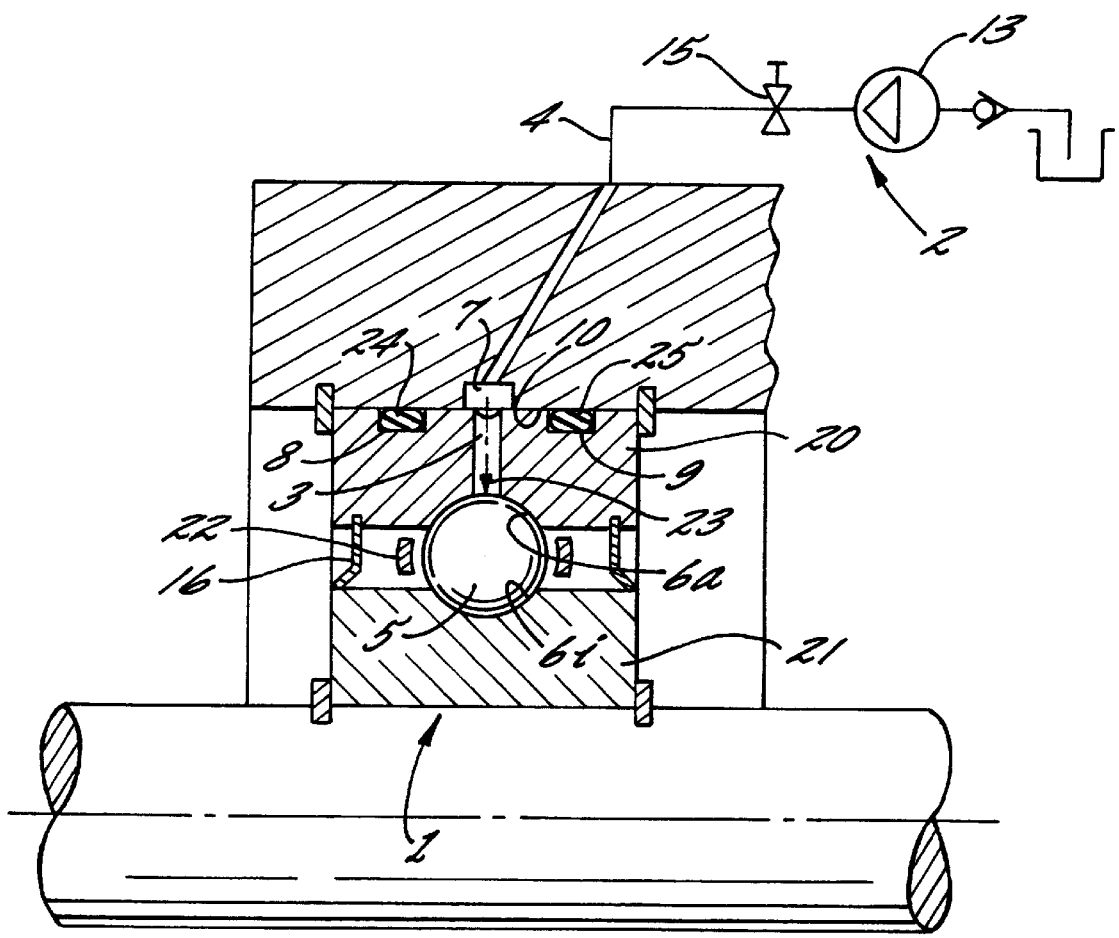
FIG. 1 illustrates a first embodiment of the invention.
Figure 3:
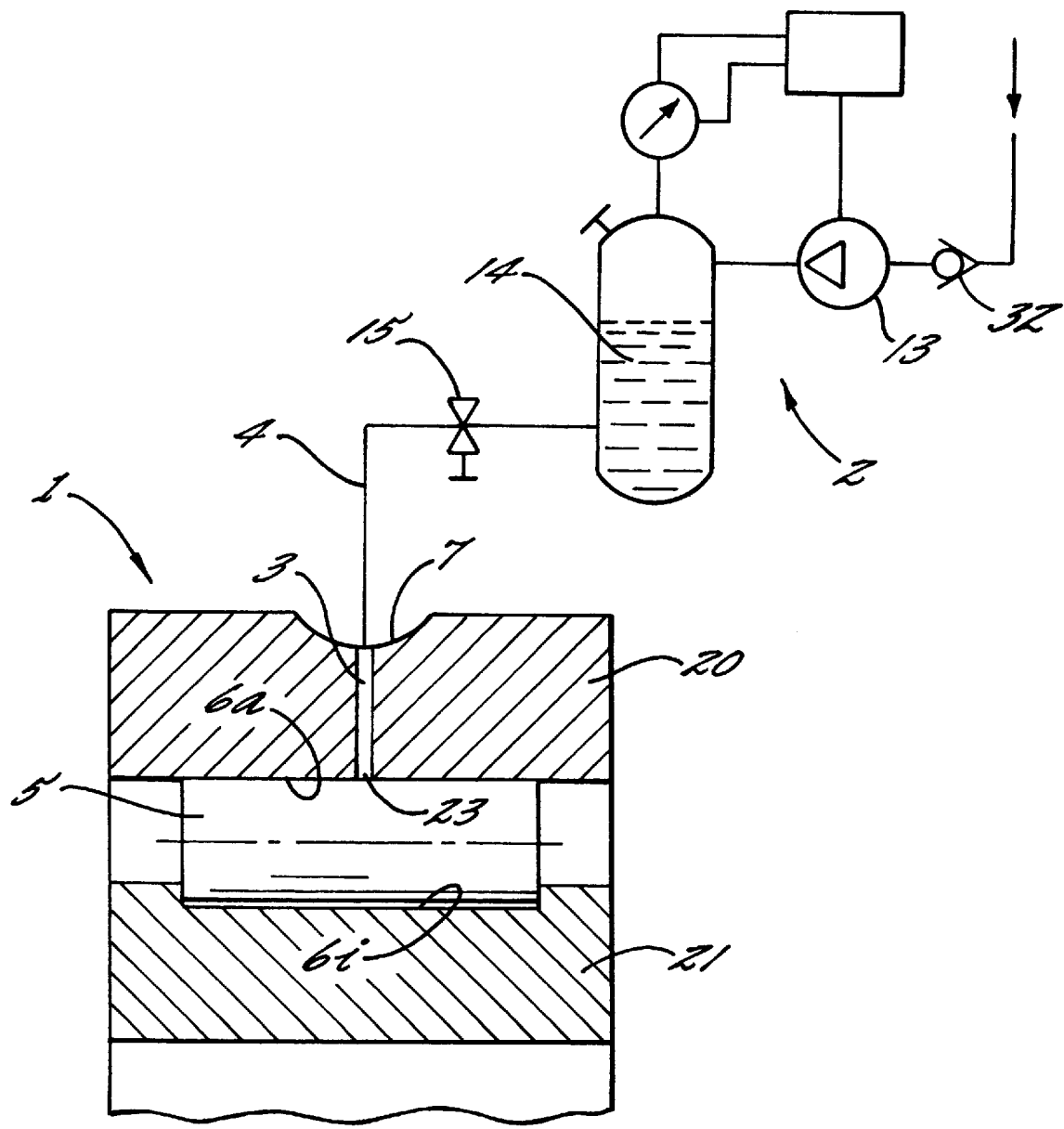
FIG. 3 shows a further embodiment of the invention.

FIGS. 1–3, in particular, illustrate an antifriction bearing 1 with a device 2 for an external supply of lubricant. The structure of such an antifriction bearing comprises an outer ring 20, an inner ring 21, and rolling elements 5 confined therebetween, which are normally secured in their position relative to one another by a cage 22, so that they roll equally spaced apart, along races 6a or 6i. Essential is that one of the bearing rings, in the illustrated embodiment outer ring 20, contains a passageway or duct 3 which connects, on the one hand, to a lubricant supply line 4, and terminates, on the other hand, in radial direction toward rolling elements 5 at 23. In the present embodiment, it thus matters that the duct 3 extends through the bearing ring such that the lubricant leaving the outer ring 20 through outlet end 23 is supplied directly to the rolling elements in the region of their race.

To this end, it is possible, on the one hand, to arrange outlet end 23 in direct vicinity of the zone contacted by the rolling elements. On the other hand, it will be advantageous to arrange outlet end 23 in a central region of one of the rolling element races, in the present embodiment, the outer race 6a. In this instance, the lubricant is supplied only where it is needed to reduce wear by building up a supportive lubricant film between the rolling elements and their race.

It is easy to visualize that duct 3 can also terminate in the inner race 6i of the rolling elements, provided this is advantageous for the installed situation.

The race for the rolling elements is that portion of the antifriction bearing rings, which is defined by radial planes which are contacted by the rolling elements on both sides. It is that portion of the race machined by grinding into the bearing rings, on which the rolling is elements are allowed to roll.

Preferably, duct 3 extends in a central radial plane, when the bearing is axially biased. In this instance, a zone under little stress develops always in the central radial plane of the bearing, so that in the course of time the outlet end 23 of duct 3 is prevented from being closed by the rolling motion. Furthermore, this type of construction has the advantage that the position of duct 3 is independent of the respectively installed position, as will be described with reference to FIG. 12.

As is further shown in FIG. 1, the outer ring 20 is fitted into a bearing seat 10. In the present embodiment, the bearing seat 10 is arranged in the surrounding housing. The end of duct 3 facing the bearing seat is cut in by a peripheral, annular lubricant groove 7. This annular lubricant groove 7 may be arranged in the outer ring 20 of the bearing. In the illustrated embodiment, however, the lubricant groove is arranged in the material of the housing, in a radial plane, in which also the duct 3 terminates on the side facing the bearing seat.

The lubricant groove 7 is again connected to lubricant supply line 4, through which lubricant is supplied to the antifriction bearing.

An advantageous further embodiment is shown in FIG. 1. In this embodiment, annular grooves 8, 9 for receiving sealing rings 24, 25 are arranged on both sides of lubricant grooves 7. Such sealing rings consist of an elastic material, and are inserted into the corresponding annular groove 8, 9 with their diameter slightly projecting therefrom. When installing the outer ring 20 of the bearing, the sealing rings are compressed by bearing seat 10 in radial direction, and thereafter rest under a bias between the bottom of their associated annular groove 8, 9 and the bearing seat 10. In this manner, a reliable sealing is realized on both sides of annular groove 7, so as to permit the lubricant to exit only, as intended, through duct 3.

In the present embodiment, the annular grooves 8, 9 are arranged in the outer ring 20 of the bearing. When the annular grooves 8, 9 are arranged in bearing seat 10, advantages in machining can be obtained, since the material of the bearing seat is easier to machine than the material of the bearing ring. Likewise, it is possible to arrange one of the annular grooves in the bearing seat, whereas the other annular groove is arranged in the bearing ring.

As is further shown in FIG. 2a and 2b the antifriction bearing 1 is under the influence of a force 11, which is applied to it, and which may be the result of a force f of a yarn looping about a godet. Air which is always present in the bearing will cause the inner ring 21 and the outer ring 20 of the bearing to displace relative to one another in radial direction (exaggerated in FIG. 2), so that a load zone 12 forms, in which the rolling elements are in constant engagement. Diametrically opposite thereto, a substantially load-free zone 26 is formed, in which the rolling elements roll along their races 6a, 6i at most under a slight pressure. As can be noted, the outlet end 23 lies outside the load zone 12 between the rolling elements 5 and their races 6a or 6i. It is recommended to arrange the outlet end 23 approximately diametrically to the center of load zone 12.

As is further shown in FIG. 1, the lubricant supply line is connected to the pressure side of a lubricant pump 13, which may be an intermittently operated pump. Alternatively, the lubricant pump may operate extremely slowly, and thus discharge continuously always only a small quantity of lubricant. Moreover, shown in FIG. 3 is an embodiment, in which lubricant supply line 4 is connected to a pressure reservoir 14. The pressure level of pressure reservoir 14 may advantageously be kept substantially constant between an upper and a lower limit value. To this end, a pressure pump 13 is used, which is interposed in a control circuit for keeping the lubricant pressure constant.

Also shown in FIG. 1 is the arrangement of a metering device 15 serving for the supply of an accurately metered quantity of lubricant in supply line 4. Such a metering device may be, for example, an externally controllable valve, which is opened from time to time. Likewise, it is conceivable to use two channel sections rotating relative to one another, which overlap each other per shaft rotation one time in meshing engagement, so as to provide during the time of the overlap a continuous passage from lubricant supply line 4 to outlet end 23 of duct 3.

As is still further shown in FIG. 1, a sealing disk 16 may be arranged on each side of the respective rolling element zones, so as to prevent on the one hand an uncontrolled discharge of the lubricant, for example, by evaporation. On the other hand, such sealing disks are useful, since depending on the installed situation, they avoid an unwanted entry of dirt into the interior of the bearing. An unwanted entry of dirt would counteract the desired lubrication effect.

Figure 4:
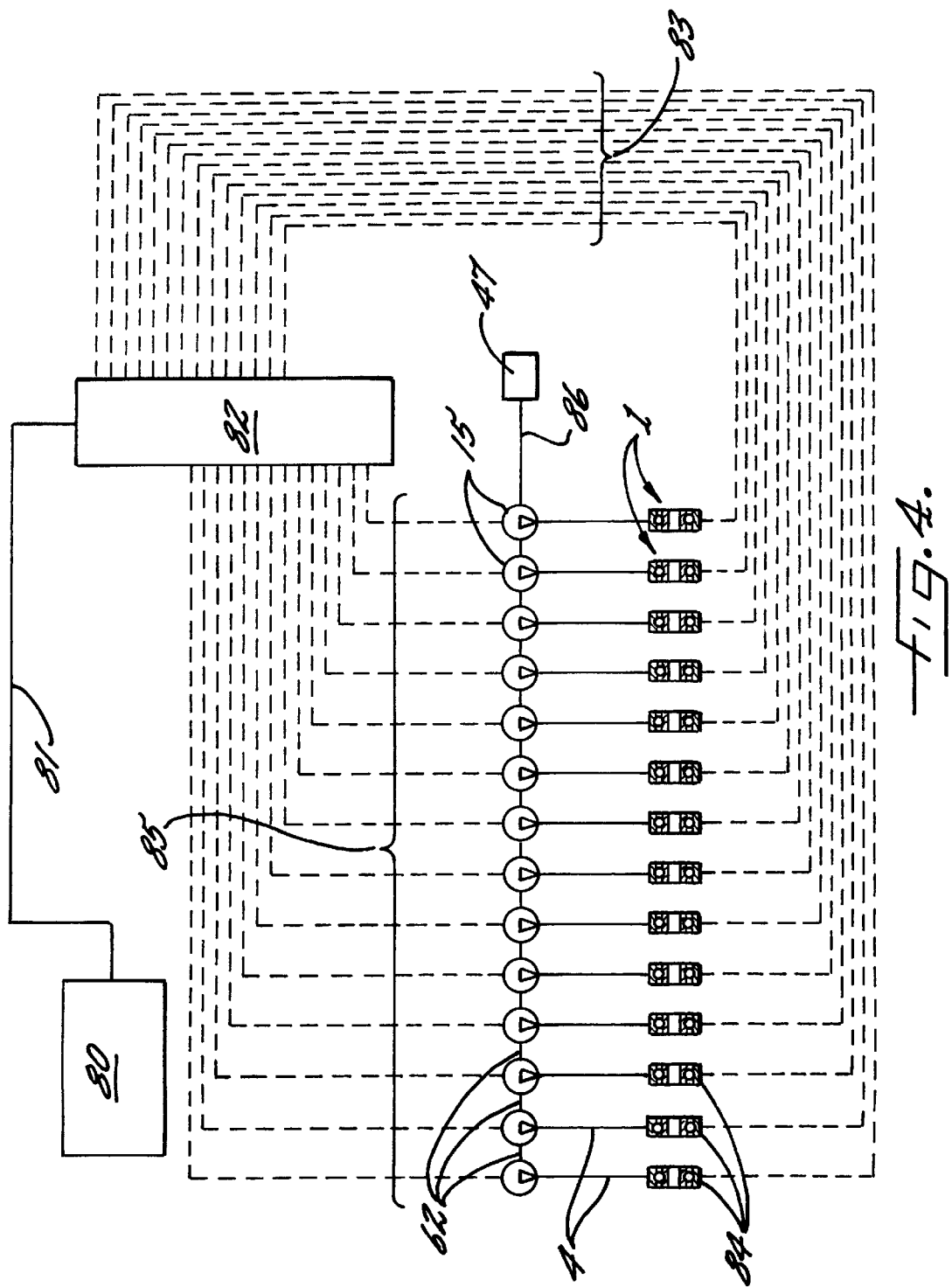
FIG. 4 shows an embodiment, which comprises a plurality of antifriction bearings in a control circuit for a controlled supply of lubricant.

Shown in FIG. 4 is a schematic diagram for the individual control of the lubricant supply to a plurality of bearing points.

From a machine control system 80, the basic adjustment resulting from the operating parameters is input via line 81 into a control unit 82. Input in control unit 82, on the other hand, are, via measuring lines 83, operating data received from the individual antifriction bearings 1 and output by measuring sensors 84, such as, for example, the temperature values or the values originating from the measuring of vibrations of the individual antifriction bearings. Control commands resulting therefrom are supplied, via control lines 85 to individual metering pumps 15, which again supply the respective antifriction bearings 1, via lubricant lines 4, with individually determined amounts of lubricant.

To this end, lubricant is removed from a tank 47 and supplied via line 86 to pumps 15, which, as shown, are interconnected via a collecting line 62.

The bearings 1 may be associated, for example, with a spinning machine. They may be part of one or more spindles driven at a high speed and carrying winding tubes, or be associated with spindles which drive the formed packages or reciprocate the yarns. For example, they may also be the bearings of feed rolls and/or draw roll of such a spinning machine.

Figure 5:
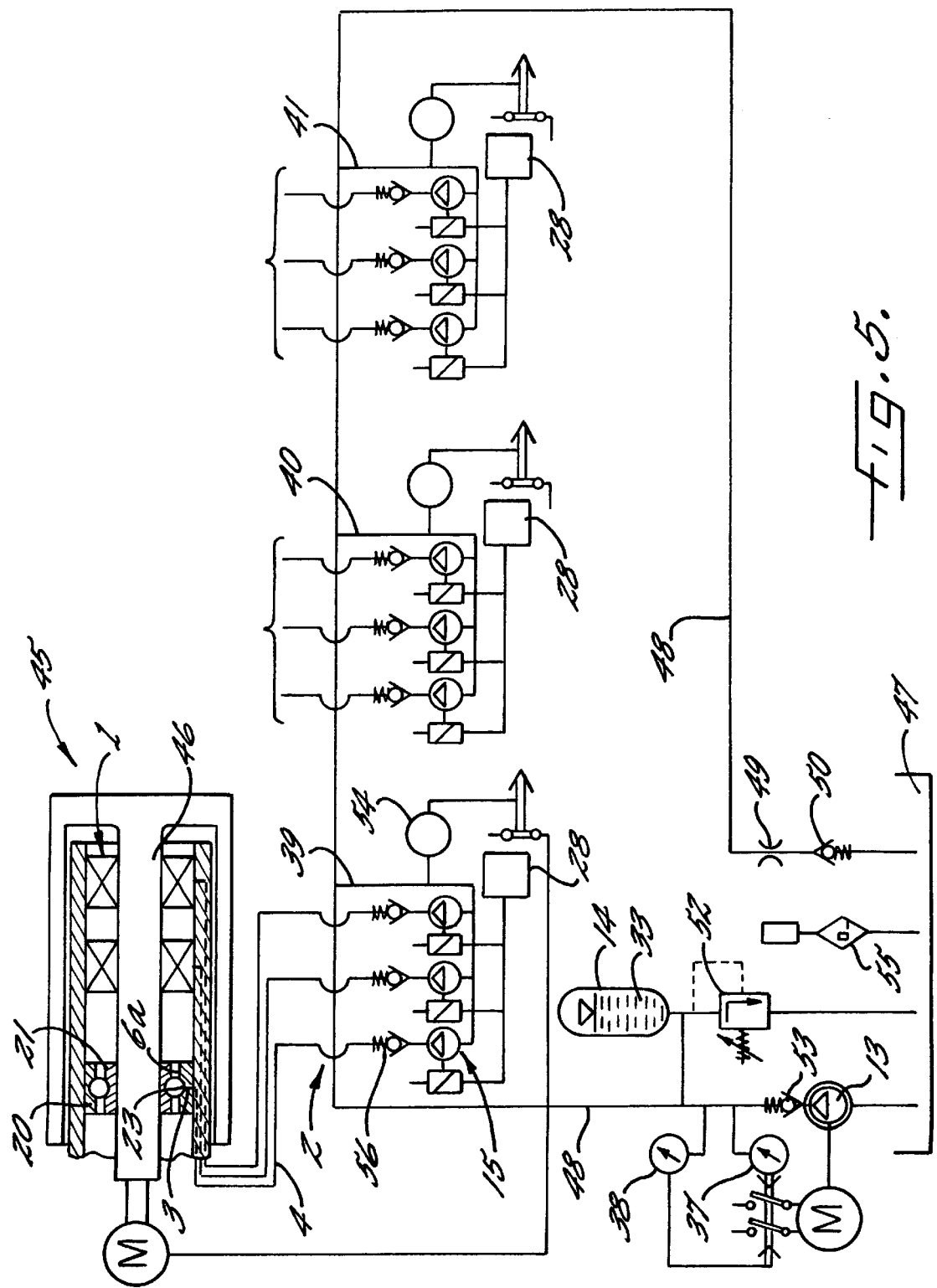
FIG. 5 shows an embodiment of the invention included in a closedcircuit supply system.

FIG. 5 illustrates a device 2 for supplying a lubricant to antifriction bearings 1. The antifriction bearings form part of a rotatable godet on a textile machine not shown in more detail for processing filament yarns. It is a characteristic of this embodiment that a godet 45 is nonrotatably connected with a mandrel 46, which is supported in the inner rings 21 of antifriction bearings 1. For this reason, the outer rings 20 of the antifriction bearings 1 are installed nonrotatingly in the housing. Suitably, the lubricant supply line 4 extends therefore from the nonrotating housing elements toward antifriction bearing 1. It is a further characteristic of this embodiment that each lubricant supply line 4 extends via a duct 3 to terminate at 23 in the nonrotating outer ring 20 of the bearing in the region of the outer race of the rolling elements.

The lubricant is delivered by means of a lubricant pump 13 from a tank 47 into a closed-circuit supply line 48. To this end, the lubricant pump 13 is arranged in the forward flow portion of a closed-circuit supply line 48. The return flow portion of the closed-circuit supply line terminates via a throttle 49 and a non-return valve 50 back in tank 47. The non-return valve 50 is biased by a compression spring, which loads the valve body from the side of the tank.

For the principle of this invention, a closable end of the return flow portion of the closed-circuit supply line would be sufficient (for example, a controllable stop valve). A throttle in combination with the subsequent non-return valve is not absolutely necessary, but advantageous as regards the control.

Tap lines 39–41 branch off from the closed-circuit supply line 48 in the illustrated embodiment. A separate metering device 15 is provided for each antifriction bearing 1. Likewise, it is conceivable that only a single metering device 15 supplies the lubricant in measured quantities via a corresponding line system leading to a plurality of antifriction bearings 1.

As one can further note, the forward flow portion of closed-circuit supply line 48 accommodates a pressure reservoir 14, which is a container filled with a lubricant 33, and in which a compressible pressure medium, for example air, is compressed above the lubricant level. As shown, the pressure reservoir has no separate connection for the gas, but one can presume that the lubricant displaces and thereby compresses the gas volume enclosed inside the pressure reservoir, so that a portion of the energy applied within the gas cushion is stored, so as to subsequently expand stepwise as the lubricant is metered.

Further shown is a pressure relief valve 52, which is to be provided for safety reasons, so as to open in response to a certain upper safety limit value. Proceeding from lubricant pump 13 in the direction of the forward flow, a non-return valve 53 is provided which prevents the lubricant from flowing back when pump 13 is shut down.

Further provided along closed-circuit supply line 48 are the several tap lines 39–41 which are followed by metering devices 15, and which, as aforesaid, are each supplied via closed-circuit supply line 48. Each metering device 15 is designed and constructed as an electrically controlled piston pump with a constant piston stroke. This permits a simple type of construction with an accurately predetermined delivery volume per piston stroke.

For a control of metering devices 15, which is common in this embodiment, a control unit 28 not shown in greater detail is used which is adjustable, if need be, with respect to control time and control intervals.

Each piston pump is separated, via a further non-return valve 56 from outlet end 23 of the associated antifriction bearing. The additional non-return valve 56 opens, as shown, in direction toward antifriction bearing 1.

As can further be noted, each tap line 39–41 extends from the closed-circuit supply line 48 vertically downward. On principle, it will suffice to lay the tap lines 39–41 such that they proceed from the closed circuit supply line with a downgrade. Already in this instance, any undissolved air bubbles would be forced to move, caused by buoyancy, in a direction toward closed-circuit supply line 48 and would then be transported in same, during the next flushing process, in direction toward tank 47. In this manner, an undersupply of lubricant to the antifriction bearing with air-enriched lubricant is reliably prevented.

Furthermore, each metering device 15 is provided with a pressure monitor 54, which picks up the inlet pressure of metering device 15. Should this inlet pressure fall below a certain lower limit value, for example, 1 bar, the corresponding antifriction bearings or bearings will be shut down, since a supply of lubricant is no longer guaranteed. If need arises, the shutdown may occur after a certain delay time, it being presumed that any lubricant still remaining in antifriction bearing 1 cannot be suddenly used up.

Continuing further in the direction which coincides with the flushing direction toward the tank, behind the last tap line 41 in closed-circuit supply line 48, there is provided a throttle 49 which is followed by nonreturn valve 50. In connection therewith, a pair of pressure monitors is arranged in the forward flow portion, of which one monitors an upper limit value 38, and the other a lower limit value 37. Upon reaching the upper limit value, for example, 3.8 bar, this pressure monitor stops lubricant pump 13. At this time, the pressure in closed-circuit supply line 48 amounts to 3.8 bar. On the other hand, the closing pressure of non-return valve 50 (caused by the bias of the compression spring), is less than 3.8 bar, for example, 3 bar. The preceding throttle 49 causes the pressure to drop, as long as the lubricant flows in the closed-circuit supply line, so that between throttle 49 and biased non-return valve 50 the pressure is always lower than in the closed-circuit supply line. The higher pressure in the closed-circuit supply line causes the lubricant to flow toward the return flow portion, at least as long as the pressure behind the throttle is higher than the closing pressure of non-return valve 50. Upon reaching the closing pressure, non-return valve 50 closes as a result of being biased by the compression spring, and any pressure still present in closed-circuit supply line 48 remains stored.

As a result of continuously removing lubricant, this pressure declines, however, in the course of time. Upon reaching the lower limit value 37, the second pressure monitor, which is a closer, restarts lubricant pump 13. The latter then pumps again the lubricant from tank 47 into the closed-circuit supply line, until the first pressure monitor, which is an opening contact, disconnects the pump again. During this operation, the closed-circuit supply line is flushed. After the pump is shut down, the flushing operation continues until non-return valve 50 closes again.

Essential is here that the closing pressure of the subsequent nonreturn valve 50 lies between the upper limit value 38 and the lower limit value 37, with the preceding throttle 49 causing a certain pressure drop, so that the pressure of closed-circuit supply line 48, reduced by the pressure drop at the throttle, is present at the subsequent, biased nonreturn valve 50.

In the place of the exclusively pressure-controlled non-return valve, it is also possible to provide an externally controllable stop valve, which is opened for flushing, while lubricant pump 13 is in operation, and is then closed, preferably, while the lubricant pump is still slowing down.

Further provided is a float switch 55 for a continuous monitoring of the tank contents. Upon falling below a minimum level, a warning signal or a shutdown signal will be emitted, if need be.

Figure 6:
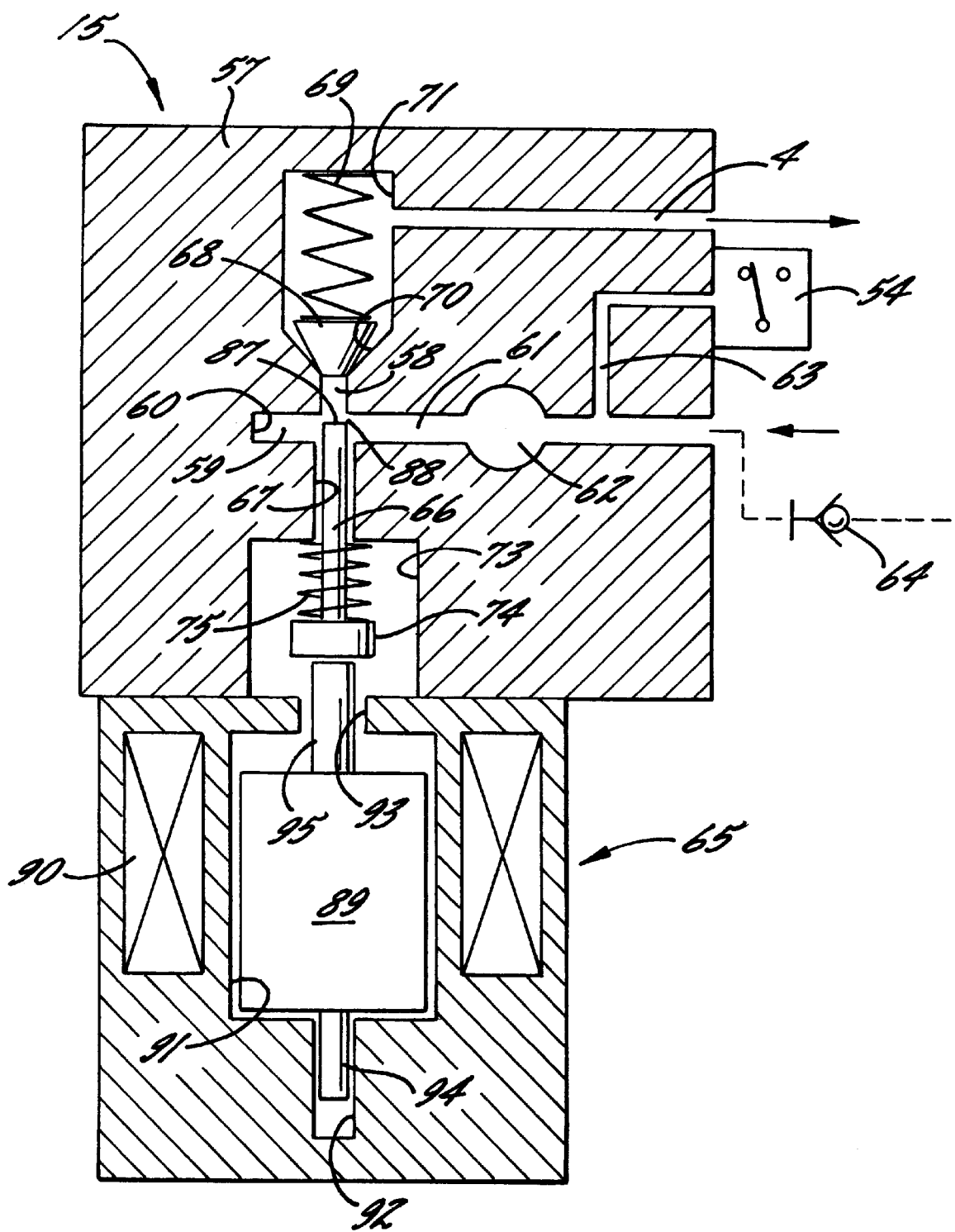
FIG. 6 shows a possible embodiment of a metering pump.
Figure 7:
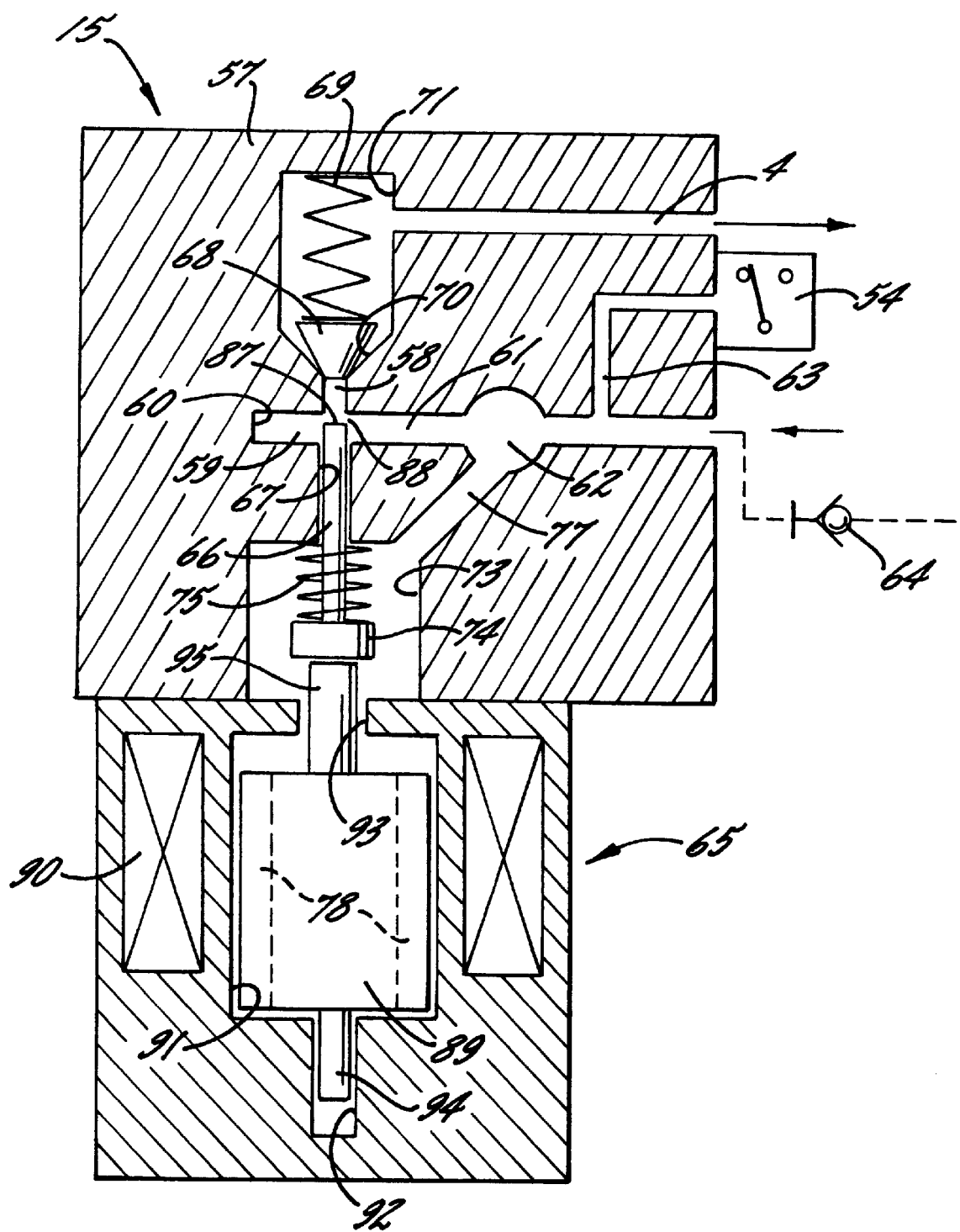
FIG. 7 shows a further embodiment of a metering pump.

The pumps 15 illustrated in FIGS. 6 and 7 show further details for carrying out the invention. These pumps are suitable for metering very small amounts of fluid, in particular lubricating oil, for a metered lubrication of antifriction bearings in accordance with this invention. The pump 15 may be rated such that it delivers per pump cycle (operating stroke) no more than 3 mm$^3$ of lubricant, it being possible to extend the distribution of this small amount of fluid, via a corresponding control of the pump piston, over more or less long periods of time.

The pump 15 is provided with a housing. Shown is only a portion 57 of the housing. Accommodated in the housing portion 57 is a pump chamber or cylinder 58, the volume of which determines the volume of the lubricating oil that is to be delivered per pump cycle (operating stroke). The cylinder 58 communicated with, at its one end, a radial bore 59, which is hereafter termed inlet chamber, and which consists of a closed portion 60 and an opposite portion 61 extending on the other side of cylinder 58 and connecting to a fluid tank not shown. The portion 61 is intersected by a collecting channel 62, which extends through the housing and, if need be, merges into similar channels of further pumps to be coupled with pump 15 (see FIG. 4).

Furthermore in portion 61, a line 63 terminates, which is connected with a pressure switch 54. The latter controls, regardless of the pressure in portion 61, a drive 65 for a pump piston 66 operating in cylinder 58, as is schematically shown, and under circumstances, also the drive of the element, the bearing of which is lubricated by pump 15 (see FIG. 5). The pump 15 is connected via a plug coupling 64 with a fluid tank or closed-circuit supply line 48 (see FIG. 5).

The piston 66 slides in a guideway 67, which extends coaxially with cylinder 58 on the opposite side of inlet chamber 61. In the idle position, the end surface of piston 66 extends into inlet chamber 59 near the one end of cylinder 58 or the boundary edge between cylinder 58 and inlet chamber 59. Thus, the piston 66 including the boundary edge form the inlet valve of the pump.

Located at the end of cylinder 58, removed from inlet chamber 59, is the outlet valve of pump 15, which is formed by a boundary edge surrounding the outlet opening of cylinder 58, and a frustoconical piston 68. In the closed state of the outlet valve, the tip of piston 68 is pressed against the boundary edge by a spiral spring 69 operative on the opposite end surface of piston 68. The boundary edge merges into a conical valve seat 70, which terminates in an outlet chamber 71. The latter accommodates spring 69 which biases piston 68. On the side of outlet chamber 71, a line 4 starts which leads to a lubricating point not shown, for example, a godet bearing (see, FIG. 5).

The cone of piston 68 consists of a relatively soft material, for example a polymer, while the boundary edge of the opening forming the valve seat is made of a hard material. The fact that the vertex angle of valve seat 70 is greater than the vertex angle of piston 68 ensures on the one hand a good sealing effect. On the other hand, the wedge-shaped annular gap which is formed by the different conicities improves the fluid flow through valve 15, when the outlet valve is opened, it being assumed that air which is entrained in the lubricating oil and, under circumstances, would collect on the boundary edge in the form of an air bubble, is discharged through this gap along with the oil. The sealing effect of the outlet valve is further improved in that the soft material of piston 68 adapts itself to the shape of the boundary edge.

The end of piston guideway 67 removed from inlet opening 59 connects via an opening to a widened recess 73. The piston 66 which has the same diameter over its entire length, extends through this opening into recess 73, and has at its end located therein a widened portion or head 74. Operative on this head 74, is one end of a spiral spring 75 which surrounds piston 66, while its other end is supported in recess 73. The spring 75 allows to keep piston 66 in its idle position, in which the front end of the piston extends into inlet chamber 59 at a small distance from the boundary edge of cylinder 58.

Located below recess 73 and fixedly connected with the pump housing is drive 65 for piston 66. The drive 65 is shown as an electromagnet, it being preferred to employ a so-called wet magnet, which is protected by a suitable enclosure against oil which may possibly leak from the pump, and which is periodically energized, so as to drive piston 66 into cylinder 58. Such electromagnets are known by their structure and operation.

The advantage of a wet magnet layout consists in that no additional seals are needed, and thus the risk of secondary air being mixed into the lubricant is eliminated. As seen in FIG. 7, an additional flood channel 77 may be provided between inlet chamber 61 and recess 73 which serves as a rotor chamber, and overflow channels 78 which extend along the direction of movement of the rotor and through same, may be provided so as to realize during the movement of the rotor a fast overflow of the lubricating oil from the one front end of the rotor to its opposite front end.

As aforesaid, the pump 15 as illustrated allows to deliver fluid quantities of about 3 mm$^3$ per pump cycle or piston stroke. Prerequisite therefore is, among other things, that the dimensions of both cylinder 58 and piston 66, and the stroke transmitted on same by drive 65 are accordingly small. Thus, the piston diameter may measure about 2 mm wide, and the piston stroke about 1 mm long. The front end of piston 66 lies in its idle position a very slight distance away from the cylinder inlet, or the boundary edge, and in its advanced position, the piston end surface comes to lie at a short distance from the front end of piston 68 directed against cylinder 58, without the two contacting each other. The oil pressure developing as a result of the upward movement of piston 66, not only causes the valve piston 68 to rise and the outlet valve to open, but also pumps out air which is entrained by the lubricating oil. This avoids that an air bubble forms, which would lead in a pump with such a short delivery stroke to considerable disturbances in its pumping operation.

The pump of FIG. 7, with small exceptions which will each be identified, corresponds to the embodiment of FIG. 6 as described above. More particularly, the pump of FIG. 7 comprises a housing which is composed of a portion 57 and a housing for drive 65. Both housing portions are interconnected in airtight manner. Formed in housing 57 is an inlet chamber which has the shape of a blind-end bore with sections 59 and 61. The open end of this blind bore is connected with an inlet channel. The connection is made by a plug coupling 64 with a non-return valve. When joining the coupling elements, the non-return valve is opened by a plunger. When separating the coupling elements the valve closes, so that the oil is unable to escape from the supply line.

Between bore sections 59 and 61, the inlet chamber is vertically intersected by a further bore with portions 58 and 67. This bore extends through the inlet chamber at a distance from the blind hole end of the inlet chamber, thereby dividing the blind-end bore into the portion 59 in the region of the blind hole end, and the inlet portion 61. The bore vertically intersecting the inlet chamber forms with its one branch 58 a cylinder, which terminates on the side facing away from the inlet chamber in an outlet chamber 71. In its inlet end region, the outlet chamber 71 is provided with a conical valve seat, which extends coaxially with cylinder 58. Arranged in the conical seat is a conical valve body 68, which is pushed by a compression spring into the valve seat 70. The angle of cone of valve body 68 is smaller than the angle of cone of valve seat 70. The tip of valve body 68 is cut off, so that the small diameter of valve body 68 corresponds substantially to the diameter of cylinder 58. Therefore, as will be described below in more detail, the small conical surface of valve body 68 is suitable to serve as a stop for the pump piston. The outlet chamber 71 has an outlet channel 4 which connects to a lubricant supply line. This lubricant supply line leads, for example and in particular, to the hole in one of the above described antifriction bearings.

Portion 67 of the bore intersecting the inlet chamber, which faces away from cylinder 58, serves as a guideway for piston 66. This piston 66 is constructed as a circular-cylindrical pin. The diameter of this pin is adapted within close tolerances to the diameter of cylinder chamber 58. The embodiment of FIG. 6 has the characteristic that the portion of the bore serving a guideway 67 is larger than the cross section of the pin, thereby permitting the oil to flow from the inlet chamber into recess 73 which will be described below. In the embodiment of FIG. 7, the portion serving as guideway 67 may be within closer tolerances, since in this embodiment, an additional flood channel 77 extends from the inlet chamber and connects the latter with recess 73.

The recess 73 is a circular-cylindrical bore which is arranged, coaxially with the bore serving as cylinder 58 and guideway 67 in the one side of housing portion 57, namely, on the side of the bore section serving as guideway 67, which faces away from the inlet chamber. The pump piston 66 measures so long that it is able to move with its one front end between the inlet chamber and the small conical surface of is valve body 68. During this movement, the piston 66 extends with its other end facing away from the inlet chamber, into recess 73. At this end, the piston is provided with a shoulder (head 74). Supported on this shoulder, on the one hand, and on the opposite end surface facing the inlet chamber, is a compression spring 75. This compression spring forces the piston 66 into an idle position, in which its front end (control end surface 87) facing cylinder 58 lies in the inlet chamber, i.e., it does not close the edge of penetration between cylinder 58 and bore 59, 61 forming the inlet chamber, hereafter referred to as control edge 88. This control edge 88 forms together with control end surface 87 the inlet valve of cylinder 58.

On its free side, recess 73 is sealed against fluid by the housing of drive 65. The drive is an electromagnet comprising an iron plunger (rotor 89) and a toroidal coil 90. The latter is embedded in the housing in fluidtight manner and connected, via lines not shown, with a control device. The rotor is straight guided in a chamber 91, which is realized by two guide bores 92 and 93. The guide bore 92 is a blind hole which is formed in the side of rotor chamber 91, which faces away from the other housing portion 57. On this side, the rotor 89 is provided with a guide pin 94, which slides in guide bore 92. The cross section of guide pin 94 is substantially smaller than the cross section of guide bore 92. This allows oil to penetrate from rotor chamber 91 into guide bore 92. The guide bore 93 connects on the one hand rotor chamber 91 with recess 73, and is used on the other hand for guidance. To permit an unimpeded oil passage, the cross section of an actuation plunger 95, which is attached to the rotor, is smaller than the cross section of guide bore 93.

It should be emphasized that rotor 89 and actuation plunger 95 are arranged along the axis of piston 66. The rotor 89 is provided with axis parallel overflow channels 78, which interconnect the two ends of rotor chamber 91. The actuation plunger 95 cooperates with the end of piston 66 facing away from control end surface 87. In the nonenergized state of ring magnet coil 90, spring 75 forces the piston, the actuation plunger 95, as well as rotor 89 into an end position, in which, as previously described, the control end surface 87 of piston 66 extends into the inlet chamber, and does not close control edge 88 of cylinder 58. Upon energizing ring magnet coil 90, rotor 89, actuation plunger 95, and piston 66 are displaced so far that control end surface 87 initially closes control edge 88, subsequently immerses into cylinder 58, forces the fluid from cylinder 58 against the pressure of valve spring 69 by opening valve body 68, and finally also contacts valve body 68.

Referring to the foregoing description, it should be remarked that it will suffice, when the control end surface 87 comes to a stop at a short distance from the valve body 68 being seated in its seat. This will be permissible in particular, when the lubricant oil does not enclose any larger amounts of air. However, should air collect in cylinder 58, the risk may arise that residual air is not entirely forced out. In this event, it will be useful that end surface 87 advances so far that valve body 68 is unable to close entirely under the pressure of spring 69. This allows to ensure that also residual air is able to escape.

It should here be expressly emphasized that the oil is supplied to the inlet chamber under pressure. It is not the primary function of the above described metering pump to increase pressure of the oil or perform the intake itself.

The characteristic of the pump and its here described construction, which also applies to the embodiment of FIG. 6, consists however in that the pump does not cause any pressure fluctuations whatsoever of the lubricant in the inlet chamber, in particular the oil, and thus likewise no pressure fluctuations during the filling of cylinder 58. To this extent, the pump differs from all known pumps, in which the pulsation of the fluid is flow on the outlet side is accompanied by a corresponding pulsation on the inlet side. In the described pump, neither the piston movement, nor the movement of the magnet rotor, nor the actuation plunger, nor the guide plunger lead to a change of the total volume, which is contained in the inlet chamber, in recess 73, and in rotor chamber 91, although the delivery is discontinuous.

In this context, it should also be noted that it is possible to join several pump housings by flanging. In this event, it will be opportune to provide only one inlet channel for all interconnected pumps. The pumps will then be joined together by a collecting channel 62, which intersects vertically the bore of all inlet chambers of the interconnected pumps.

Likewise, in this event, a single pressure monitor 54 will suffice, which performs a desired switching, when the pressure drops in the inlet chamber, for example, when it falls below a minimum value and the machine shuts down, so as to prevent a dry operation. In this instance, each of the pumps will serve as a metering pump for an antifriction bearing.

In the operation of the pumps, lubricating oil is supplied under a certain pressure, for example 2 bar, via the radial bore or inlet chamber 59, to cylinder 58. In the illustrated, idle position of piston 66, the lubricating oil flows not only into cylinder 58, but also into the closed portion 60 of inlet opening 59. As a result, piston 66 is biased by centripetally the same pressure, which is highly significant, especially in view of the small diameter of piston 66. In an upward movement which is triggered by the magnet, piston 66 enters into the cylinder, whereby the oil therein flows into outlet chamber 71 by raising valve piston 68, and subsequently, via line 4 to the point to be lubricated. Thereafter, when piston 66 is returned by the force of spring 75 to its illustrated position, piston 68 of the outlet valve closes the outlet opening, and a vacuum forms in cylinder 58 as a result of the downward movement of piston 66. As soon as the end surface of piston 66 emerges from cylinder 58 and slides into inlet opening 59, i.e. toward the end of the intake cycle of piston 66, the vacuum causes lubricating oil to refill cylinder 58 very rapidly and independently of the movement of piston 66. Thereafter, the pump is able to perform a further pumping cycle.

Figure 8:
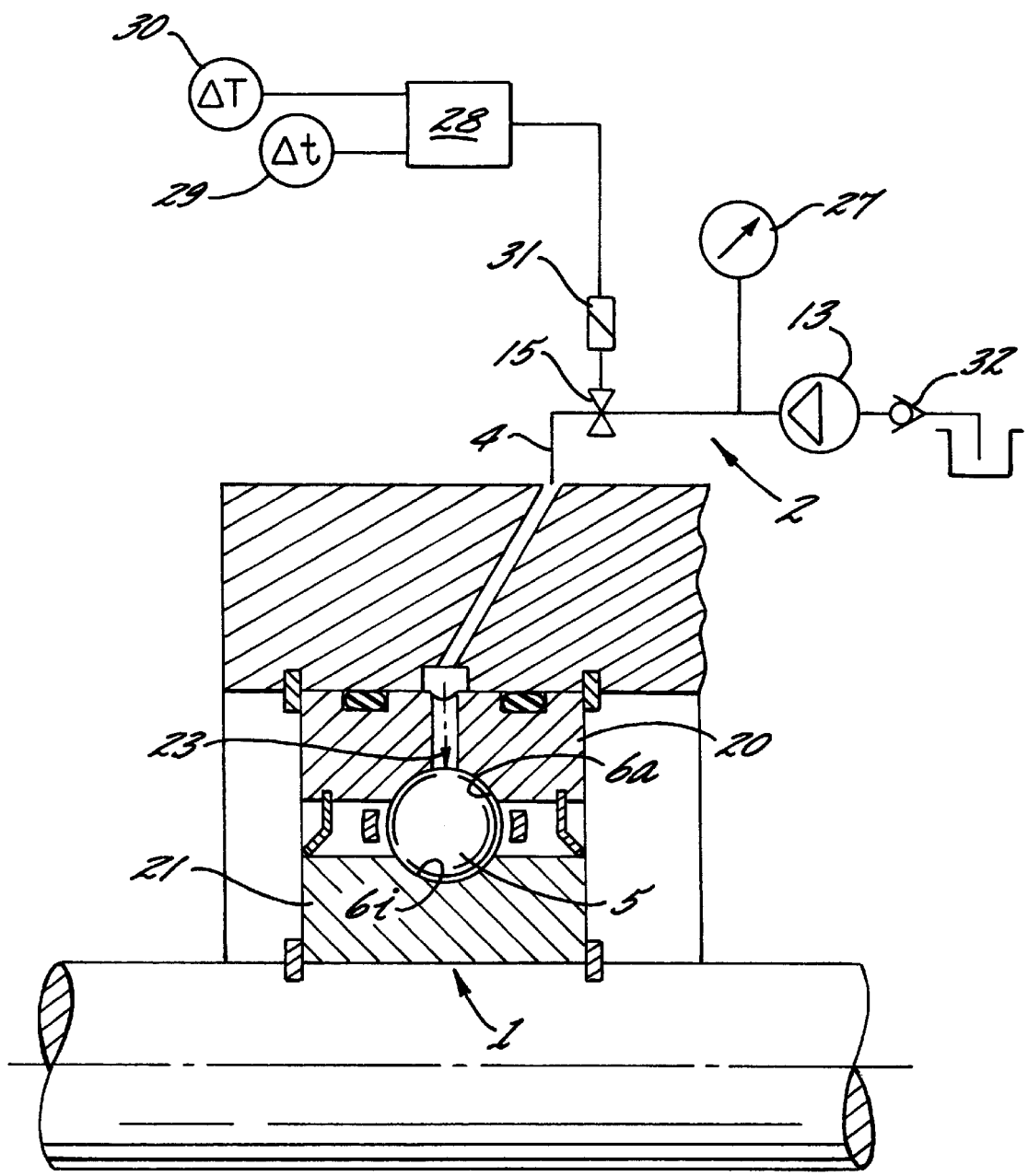
FIG. 8 shows an embodiment of the invention with a metering valve.
Figure 8A:
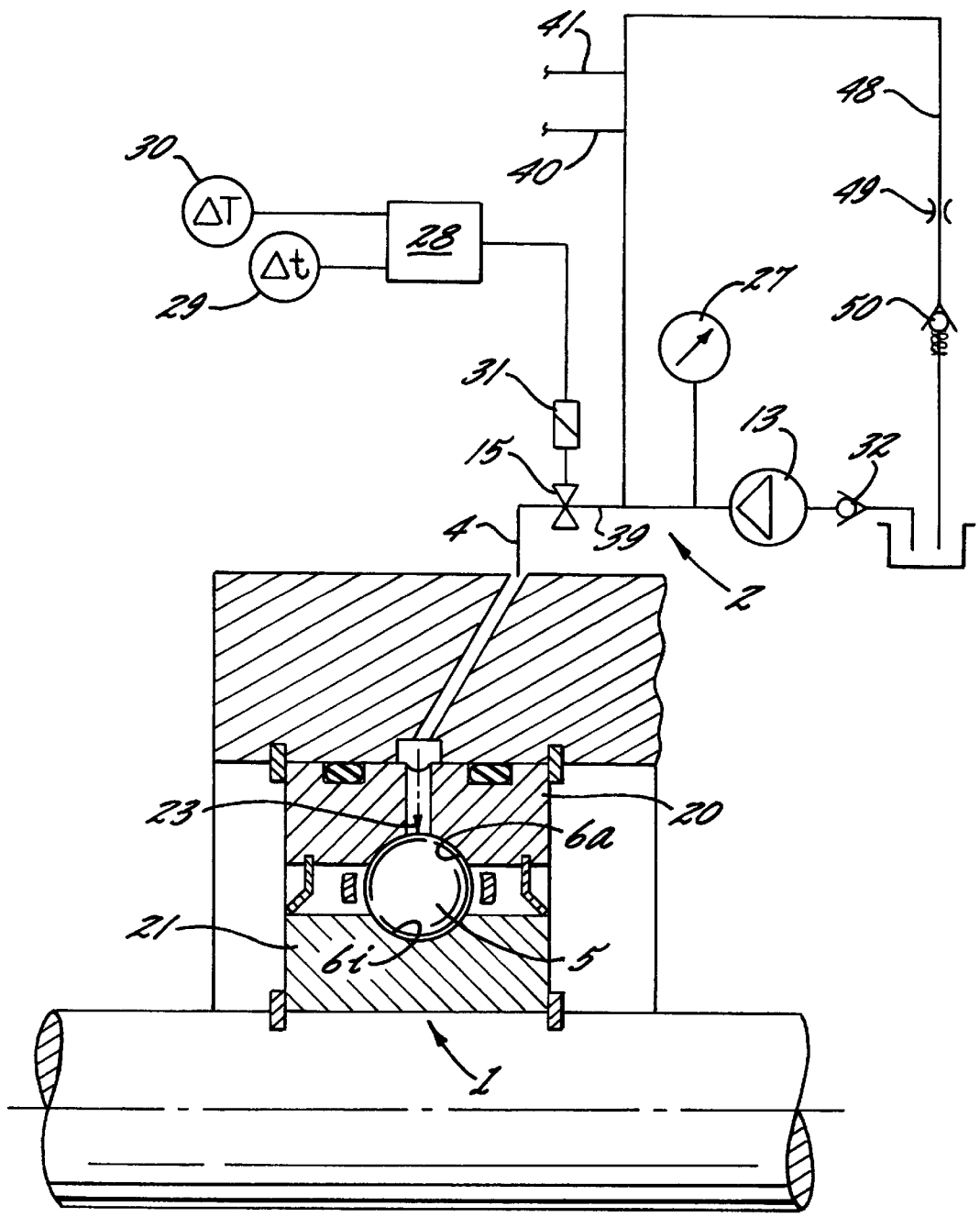
FIG. 8a shows an embodiment in accordance with FIG. 8 with a closed-circuit supply system of FIG. 5.
Figure 9:
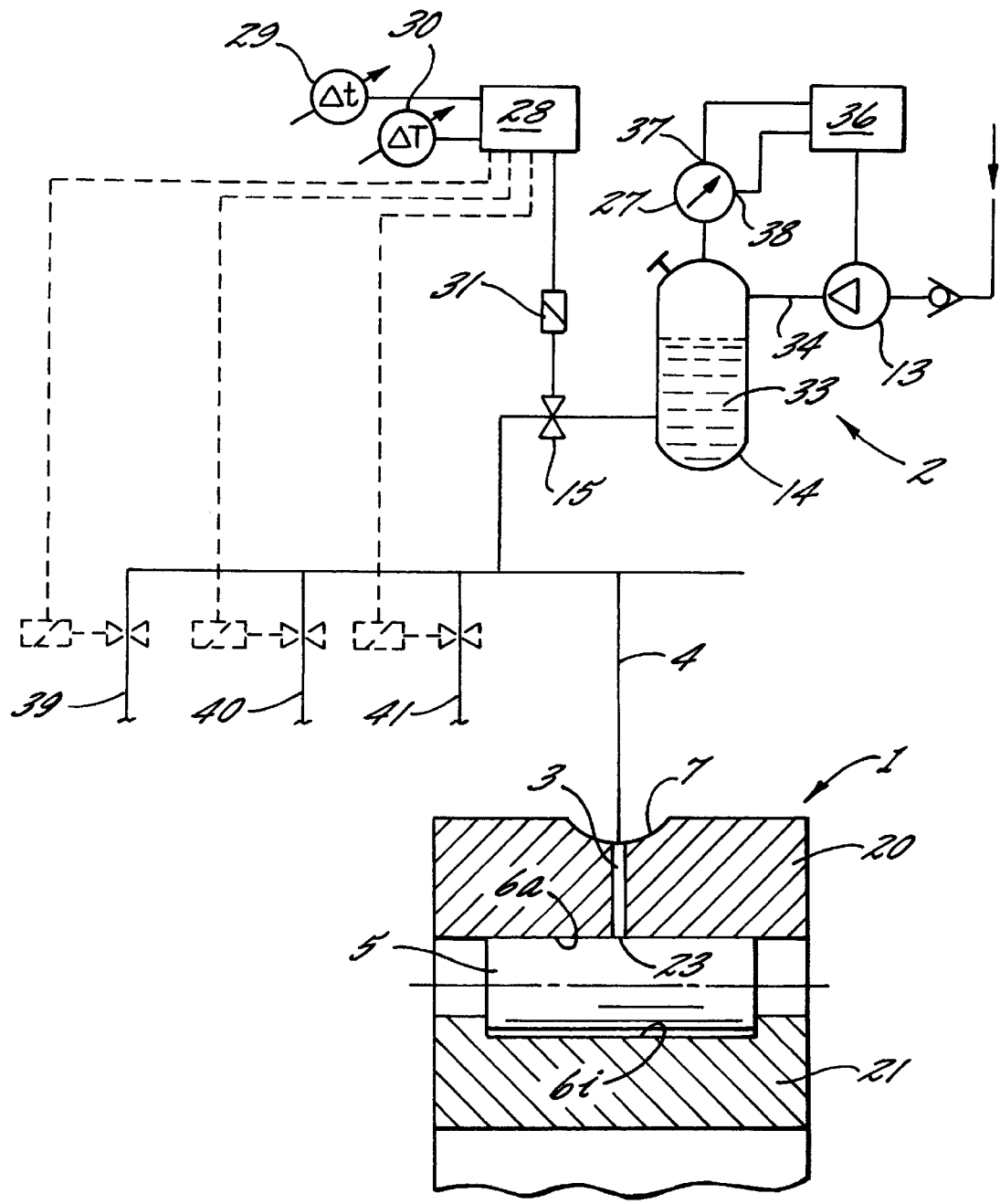
FIG. 9 shows an embodiment of the invention with a metering valve and a reservoir.

Each of FIGS. 8, 8*a*, and 9 illustrate an antifriction bearing 1 with a device 2 for supplying a lubricant. This device 2 comprises a lubricant supply line 4, through which the lubricant is delivered to antifriction bearing 1. In the region of antifriction bearing 1, lubricant supply line 4 has an outlet end 23 from which the lubricant exits in direction toward antifriction bearing 1. This special case includes in addition the characteristic that the lubricant supply line 4 extends through the outer ring 20 of the antifriction bearing, and that the lubricant supply line 4 terminates substantially in the region of the outer or inner race 6*a* or 6*i* of the rolling elements in direction of the rolling elements 5.

It is, however, expressly stated that this invention it not limited to this structural form. In particular, the lubricant supply line may extend also from a lateral direction to rolling elements 5, and be directed in the region of the cage of the rolling elements laterally in direction toward the rolling elements.

In the present embodiments, the lubricant is put under an increased pressure in lubricant supply line 4. As is indicated by pressure gauge 27, this pressure is understood to be above the atmospheric pressure. In the end region of lubricant supply line 4, a controllable valve 15 is arranged, which retains the lubricant put under increased pressure in line 4, as long as this valve 15 is closed. As can be noted, the valve can be actuated by a control device 28. As need arises, the latter opens and closes the valve. The lubricant being thereby caused to exit under increased pressure, leaves outlet end 23 of lubricant supply line 4, as long as valve 15 is opened. Upon closing valve 15 by means of control device 28, the exiting lubricant flow is separated, and the lubrication period is completed.

A characteristic of this invention lies in that the control device possesses two possibilities of adjustment. To this end, it is possible to adjust by means of a first adjusting device 29 the duration ΔT, for example, every two hours. This control device thus allows to meter the quantity of lubricant exiting each time, as a function of the duration of its exit, as well as the time of its exit, in the most accurate manner, so that only the quantity of lubricant is supplied which is required by antifriction bearing 1.

To this end, as can be noted, the control device 28 is operative on the electric control of the valve. In the present embodiment, the valve is actuated by an electrically controllable magnet 31.

As best seen in FIG. 8, the existing lubricant supply lines can easily be developed into pressure reservoirs, it being preferred to close these lubricant supply lines 4 toward the inlet side by a non-return valve 32. The function of this non-return valve is that the pressure built-up in lubricant supply line 4 remains stored free of losses.

The length of lubricant supply line 4 may, if desired, be enlarged by the installation of additional loops, if a certain storage volume is to be realized.

As shown in FIG. 8*a*, it is also possible to provide a closed-circuit supply system 48, which may be structured in accordance with FIG. 5.

As is shown moreover in FIG. 9, the lubricant can be supplied from a pressure reservoir 14, which may be biased by a pressure medium, preferably air or another gas. To this end, a special pressure reservoir 14 is provided, which contains on the one hand a lubricant 33. Above the lubricant level, pressure reservoir 14 is biased by a pressure medium supplied via a line 34. To this end lubricant pump 13 delivers is in pressure line 34 only the medium for increasing the pressure, in that it takes in ambient air and, if need be, after a corresponding filtering and drying, pumps same into pressure reservoir 14. As a result, a volume forms in the pressure reservoir above the lubricant level, which causes that lubricant 33 is supplied under pressure to the lubrication points of antifriction bearing 1, even in the absence of the respective pump operation.

As can further be noted, the pressure reservoir 14 is provided with a pressure gauge 27. In this embodiment, the latter acts as a start-stop switch, which connects or disconnects lubricant pump 13, via a switching device 36. Once the existing pressure level falls below the lower limit value 37, pressure gauge 27 starts lubricant pump 13, via switching device 36, for example, by means of a relay. As a result, the pressure increases in pressure reservoir 14. As soon as the pressure gauge registers the reaching of the upper limit value 38, lubricant pump 13 is disconnected by switching device 36, until the pressure of pressure reservoir 14 reaches again its lower limit value. Further shown in FIG. 9 is in phantom lines that lubricant supply line 4 includes a plurality of tap lines 39–41 for supplying lubricant to several antifriction bearings 1. As can be noted, in this instance, the controllable valve 15 can be arranged in the common lubricant supply line 4 of all tap lines 39–41. In this instance, the advantage presents itself that, with little constructional expenditure, all tap lines are jointly controlled.

However, if far removed antifriction bearings are to be supplied with lubricant, it will be opportune to employ the embodiment shown in phantom lines. In this instance, a corresponding valve 15 is arranged at the end of each tap line. All these valves 15 may be actuated jointly at the same time, or individually in accordance with the lubricant requirements determined for each antifriction bearing.

This has the advantage of yet a cost-favorable construction, since only a single control device will be needed, which actuates in parallel connection all metering valves at the same time, or drives each time via carrier frequencies only certain metering devices.

Figure 10:
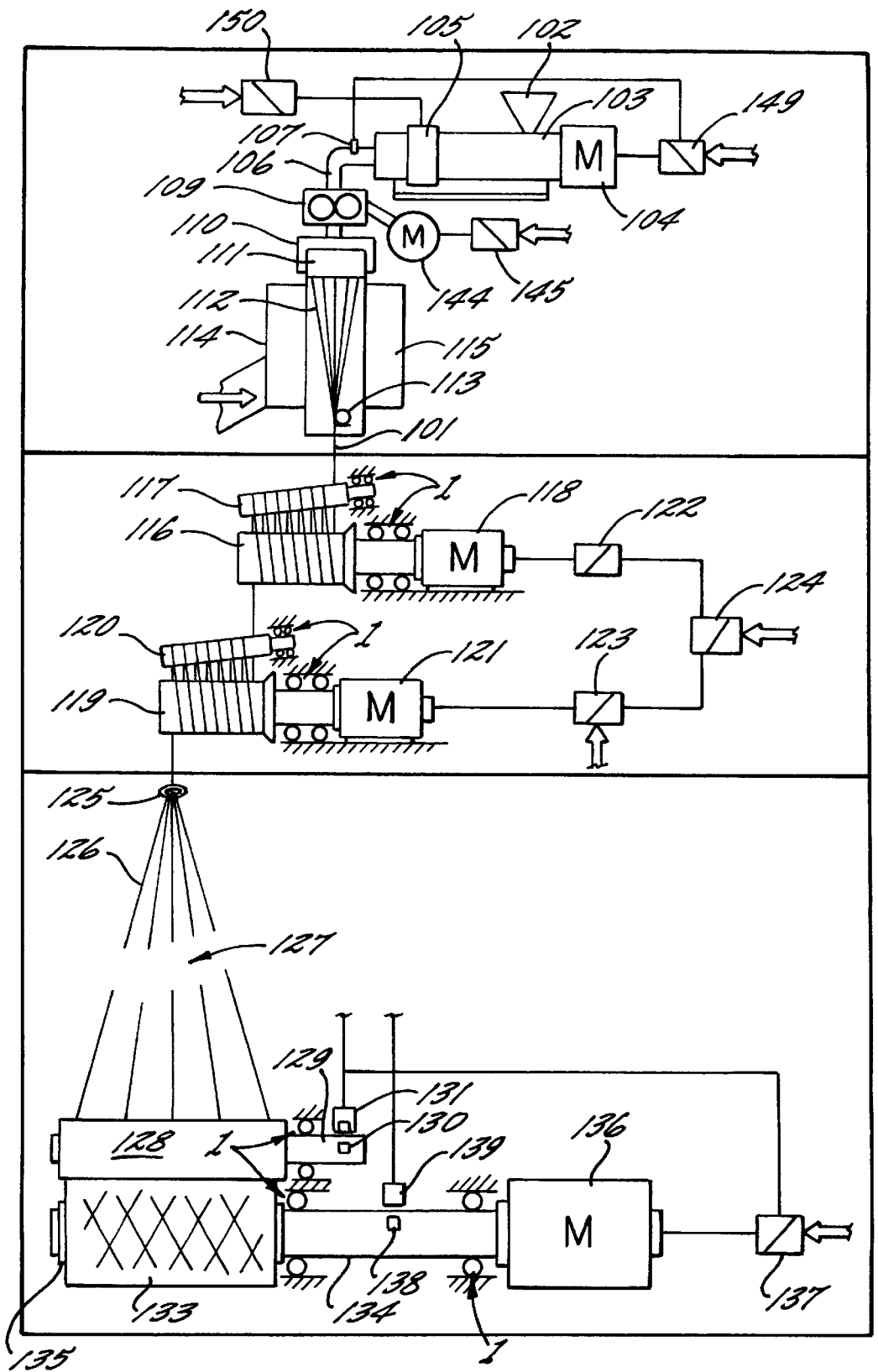
FIG. 10 is a schematic view of a spinning system for filament yarns with the processing steps of extruding, drawing, and winding.

Shown in FIG. 10 is the invention put to practice in a textile machine for producing endless, synthetic filament yarns.

A yarn 101 of a thermoplastic material is spun. The thermoplastic material is supplied by means of a feed hopper 102 to an extruder 103. The extruder 103 is driven by a motor 104 which is controlled by a motor control unit 149. In extruder 103, the thermoplastic material is melted. To this end, use is made of the deformation work (shearing energy) which is applied to the material by the extruder. In addition, a heating system 105, for example, in the form of a resistance heater is provided, which is activated by a heater control unit 150. Through a melt line 106, in which a pressure sensor 107 is provided for measuring the pressure of the melt intended for controlling the pressure and speed of the extruder, the melt reaches a gear pump 109, which is driven by a pump motor 144. The latter is controlled by a pump control unit 145 such as to permit to very finely adjust the pump speed. Pump 109 delivers the melt flow to a heated spin box 110, the underside of which accommodates a spinneret 111, from which the melt exits in the form of sheets of fine filaments 112. The latter advance through a cooling shaft 114, in which an air current is directed transversely or radially to the sheet of filaments 112, thereby cooling the filaments.

At the end of cooling shaft 114, the sheet of filaments is combined by an spin finish roll 113 to a yarn 101 and provided with a finish. From cooling shaft 114 and spinneret 111, the yarn is withdrawn by a delivery roll or godet 116, about which the yarn loops several times. To this end, a guide roll 117 is used, which is arranged offset with respect to godet 116. The latter is driven by a motor 118 and frequency converter 122 with preadjustable speed. This delivery speed is by a multiple higher than the natural exit speed of filaments 112 from spinneret 111.

Arranged downstream of godet 116 is draw roll or godet 119 with a further guide roll 120. Both correspond in their arrangement to delivery roll 116 with guide roll 117. For the drive of draw roll 119, a motor 121 and frequency converter 123 are used. The input frequency of frequency converters 122 and 123 is evenly predetermined by a controllable frequency generator 124. This allows to individually adjust on frequency converters 122 and 123 the speed of delivery roll 116 and draw roll 119 respectively. The speed level of delivery roll 116 and draw roll 119 is however collectively adjusted on frequency converter 124.

From draw roll 119, the yarn 101 advances to a so-called "apex yarn guide" 125 and thence to a traversing triangle 126, where a known yarn traversing mechanism 127 (not shown) is provided. The latter comprises, for example, oppositely rotating blades, which reciprocate the yarn 101 over the length of a package 133. In so doing, downstream of traversing mechanism 127, yarn 101 loops about a contact roll 128, which rests against the surface of yarn package 133. The latter is wound on a tube 135, which is mounted on a winding spindle 134. Winding spindle 134 is driven, by a motor 136 and spindle control 137 such that the surface speed of package 133 remains constant. To this end, the speed of freely rotatable contact roll 128 is sensed as a control variable on contact roll shaft 129 by means of a ferromagnetic insert 130 and a magnetic pulse generator 131.

Analogously, the foregoing also applies to both a ferromagnetic insert 138 and pulse generator 139 of spindle 134.

It should be mentioned that yarn traversing system 127 may also be a standard cross-spiralled roll with a traversing yarn guide reciprocating in a cross-spiralled groove across the traversing range.

The textile machine, of which only one processing station is shown, comprises a plurality of individual antifriction bearings 1, which are structured corresponding to the above described antifriction bearings 1 and supplied with a metered amount of lubricant. Their foregoing description is herewith incorporated by reference.

Illustrated in FIG. 11 are three possible embodiments of an antifriction bearing, in which the outlet end 23 of duct 3 can also be arranged on the side of the rolling element race, which is biased by the transverse force 11 of the bearing. To avoid in this embodiment that the rotating rolling elements roll over outlet end 23, thereby closing it in the course of time, the race is provided with at least one, preferably however several, annular rolling zones 150, which permit an accurately defined rolling motion of rolling elements 5.

Such antifriction bearings are described as so-called multipoint ball bearings, with the number of points indicating the number of annular rolling zones, which the rolling element contacts with respect to both races. Preferably, the geometrical arrangement of annular rolling zones is such that the rolling condition is met in each point of the annular rolling zones.

The first embodiment is illustrated in FIG. 11a and comprises a so-called four-point ball bearing. Formed in the outer and the inner ring are each two annular rolling zones 150. Therebetween, contactfree annular zones 151 are formed, which are described within the scope of the present invention as the no load zone in the race of the rolling elements. In the illustrated four-point ball bearing, the no load zone of the race extends between the two annular rolling zones 150 arranged in each bearing ring. In this zone, there is no contact between the bearing ball and its associated race. Consequently, it is natural to arrange outlet end 23 of hole 3 in this region. By way of example, it is assumed that in the present embodiment hole 3 is arranged in the outer bearing ring.

Contrary thereto, the second embodiment as shown in FIG. 11b, illustrates a so-called twopoint ball bearing, in which, related to an axial section, the curvature of the ball is greater than the curvature of its respective race 6a, 6i. As a result, only one annular rolling zone is created in each race, while a no load zone of the race is formed on the side of each annular rolling zone.

Characteristic of this zone is a slight, radial spacing between the ball, as it passes by, and the surface of the race. Generally, in this space, there is no contact between the ball and the surface of the race. An occasional contact however is harmless. It is therefore possible to arrange in this zone of the race the outlet end 23 of duct 3 also on the bearing side which is biased by the transverse force of the bearing.

Moreover, within the scope of this invention, it is still further possible to employ a so-called three-point ball bearing, as is shown in the illustration of FIG. 11c. The foregoing description applies to this illustration in corresponding manner.

Supplementing the foregoing, shown in FIG. 12 is an embodiment of this invention employing axially biased grooved ball bearings mounted on the shaft. They are two single row ball bearings which are mounted relative to one another in the axial direction of the shaft. This is common practice in mechanical engineering, so as to keep the axial play of the supported shaft as small as possible. For this reason, the left ball bearing rests with its outer ring against the offset portion of a housing 96, thus defining clearly the position of the outer ring relative to the housing. The end surface of the left ball bearing is pressed against the offset housing portion by means of a clamping cover 97. To this end, the clamping cover 97 engages on the outer ring of the right-hand ball bearing and pushes same in direction toward the ball bearing on the offset housing portion.

This axially biased bearing is quite common, so that with respect to details not shown, reference may be made to the state of the art. Essential however is that between the two ball bearings an axial stay is produced, whereby the bearing balls are shifted in their respective races such that the annular contact zones 150 do no longer lie in one radial plane, but in an oblique plane slightly inclined thereto. The contact zones are formed as substantially annular rolling zones 150, which, when related to each ball bearing, are arranged in the one bearing ring to the right, and in the other bearing ring to the left of the central radial plane of the bearing. Thus, the annular rolling zone undergoes a certain lateral displacement from the central radial plane of the bearing. As a result, the central radial plane of the bearing is relieved from a load, so that a substantially contactfree, annular zone is formed, which allows to accommodate the outlet end 23 of duct 3.

Consequently, in the case of axially biased bearings, it is possible to employ the invention likewise with the use of a standard, single row grooved ball bearing, with an essential, additional advantage consisting in that the outlet end 23 of duct 3 can also be arranged in the central radial plane of the bearing, inasmuch as it is a substantially contactfree annular zone, which forms the no load zone of the ball race.

We claim:

1. A system for supplying lubricant to a pluiality of lubrication locations comprising:

a lubricant supply tank, a closed circuit supply line having first and second ends, with the first end communicating with the tank via a lubricant pump, and with the second end communicating with the tank via a pressure regulating valve, and a plurality of tap lines connected to the closed circuit supply line at a location downstream of the pump and leading to respective lubrication locations via a metering device in each tap line, and wherein each metering device is configured to control the lubricant flow within a range of flows.

2. The lubricant supplying system as defined in claim 1 further comprising a throttle positioned in said closed circuit supply line immediately upstream of the pressure regulating valve.

3. The lubricant supplying system as defined in claim 1 further comprising a pressure reservoir which communicates with said closed circuit supply line at a location between said pump and said tap lines.

4. The lubricant supplying system as defined in claim 3 further comprising a pressure relief valve connected to said pressure reservoir and leading to said supply tank.

5. The lubricant supplying system as defined in claim 1 wherein said metering device is a metering pump.

6. The lubricant supplying system as defined in claim 1 where in said metering device is a controllable valve.

7. The lubricant supplying system as defined in claim 1 wherein each tap line extends in a downward direction toward its associated metering device.

8. The lubricant supplying system as defined in claim 1 further comprising a control system for maintaining a pressure in the closed circuit supply line between upper and lower limits, and wherein the pressure regulating valve comprises a non-return valve having a closing pressure which lies between said upper and lower limits.

9. The lubricant supplying system as defined in claim 1 further comprising a pressure monitor connected to each tap line for sensing the inlet pressure to the associated metering device, and a safety switch operatively connected to each pressure monitor and which is programmed such that when the pressure falls below a lower limit value, a disconnecting signal is emitted to the associated lubrication location.

10. The lubricant supplying system as defined in claim 9 wherein the safety switch includes a delay such that the disconnecting signal is emitted after a predetermined time delay.

11. A system for supplying lubricant to a plurality of antifriction bearings comprising:

a lubricant supply tank, a closed circuit supply line having first and second ends, with the first end communicating with the tank via a lubricant pump, and with the second end communicating with the tank via a pressure regulating valve, a plurality of antifriction bearings, and a plurality of tap lines, connected to the closed circuit supply line at a location downstream of the pump and leading to respective antifriction bearings via a metering device in each tap line, and wherein each metering device is configured to control the lubricant flow within a range of flows.

12. A system for supplying lubricant to a lubrication location, comprising:

a pressurized lubricant supply, a lubricant supply line leading from the lubricant supply to a lubrication location, and a controllable valve positioned in the lubricant supply line for placing and retaining the lubricant in the lubricant supply line under a relatively high pressure during periods when the valve is closed, and wherein the controllable valve is an electrically controllable magnetic valve.

13. The lubricant supplying system as defined in claim 12 wherein the controllable valve is configured to control the quantity of lubricant supplied to the lubrication location via a sequence of tripping signals of a predetermined duration and a controlled frequency.

14. The lubricant supplying system as defined in claim 12 wherein the controllable valve is configured to control the quantity of lubricant supplied to the lubrication location via a sequence of tripping signals of predetermined frequency and controlled duration.

15. The lubricant supplying system as defined in claim 12 wherein the pressurized lubricant supply includes a pressure reservoir communicating with the lubricant supply line.

16. The lubricant supplying system as defined in claim 15 further comprising a non-return valve positioned on the inlet side of the pressure reservoir.

17. The lubricant supplying system as defined in claim 15 wherein the pressure reservoir comprises a closed tank which includes a compressible pressure medium.

18. The lubricant supplying system as defined in claim 17 further comprising a control for maintaining the pressure of the compressible pressure medium and thus the pressure in the lubricant supply line between upper and lower limits.

19. A lubricant supplying system as defined in claim 12 further comprising an antifriction bearing, and wherein the lubrication location is positioned so as to deliver the lubricant to said antifriction bearing.

* * * * *

UNITED STATES PATENT AND TRADEMARK OFFICE
CERTIFICATE OF CORRECTION

PATENT NO. : 5,971,107
DATED : October 26, 1999
INVENTOR(S) : Stitz et al.

It is certified that error appears in the above-identified patent and that said Letters Patent is hereby corrected as shown below:

Title page,
Item [56] References Cited, FOREIGN PATENT DOCUMENTS, insert the following:

-- 0 288 941    11/1988    European Pat. Off. --.

Signed and Sealed this

Twentieth Day of November, 2001

Attest:

*Nicholas P. Godici*

NICHOLAS P. GODICI
*Attesting Officer*   *Acting Director of the United States Patent and Trademark Office*